US011017367B2

(12) United States Patent
Takeuchi

(10) Patent No.: US 11,017,367 B2
(45) Date of Patent: May 25, 2021

(54) PROCESSING DEVICE, PROCESSING DEVICE CONTROL METHOD, AND RECORDING MEDIUM

(71) Applicant: NEC Corporation, Tokyo (JP)

(72) Inventor: Toshiki Takeuchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 798 days.

(21) Appl. No.: 15/550,447

(22) PCT Filed: Feb. 17, 2016

(86) PCT No.: PCT/JP2016/000824
§ 371 (c)(1),
(2) Date: Aug. 11, 2017

(87) PCT Pub. No.: WO2016/136196
PCT Pub. Date: Sep. 1, 2016

(65) Prior Publication Data
US 2018/0032982 A1 Feb. 1, 2018

(30) Foreign Application Priority Data

Feb. 26, 2015 (JP) .............................. JP2015-037158

(51) Int. Cl.
G06Q 40/00 (2012.01)
G06Q 20/14 (2012.01)
G06F 9/50 (2006.01)

(52) U.S. Cl.
CPC ............. *G06Q 20/145* (2013.01); *G06F 9/50* (2013.01); *G06F 9/5011* (2013.01)

(58) Field of Classification Search
CPC .................................................... G06Q 40/00
(Continued)

(56) References Cited

U.S. PATENT DOCUMENTS

2003/0236745 A1* 12/2003 Hartsell ............... G06Q 20/102
705/40
2005/0261915 A1 11/2005 Ooki et al.
(Continued)

FOREIGN PATENT DOCUMENTS

JP 2004-173170 A 6/2004
JP 2007-011621 A 1/2007
(Continued)

OTHER PUBLICATIONS

China Mobile Research Institute, "C-RAN, the road towards green RAN", White Paper Ver.3.0, Dec. 2013 (91 pages).
(Continued)

*Primary Examiner* — Ojo O Oyebisi

(57) ABSTRACT

A processing device allocates processing resources to a communication processing and an application processing and executes at least the communication processing and the application processing. The processing device includes: a communication interface and at least one processor that operates to execute a scheduling processing that allocates communication processing resources that are at least a part of the processing resources to the communication processing in a preferential manner and a billing processing that bills a user of the application processing according to a usage amount of processing resources used for the application processing. The application processing includes a non-priority application processing processable in a non-preferential manner. The scheduling processing is capable of allocating, when a load on the communication processing resources does not reach a predetermined threshold, the communication processing resources to the non-priority application processing. The billing processing bills for the non-priority application processing at a usage fee of the communication processing resources more inexpensive.

10 Claims, 15 Drawing Sheets

(58) Field of Classification Search
USPC .......................................................... 705/40
See application file for complete search history.

(56) References Cited

U.S. PATENT DOCUMENTS

| | | |
|---|---|---|
| 2007/0005799 A1 | 1/2007 | Matsumoto et al. |
| 2013/0179289 A1 | 7/2013 | Calder et al. |
| 2014/0156853 A1 | 6/2014 | Suda et al. |

FOREIGN PATENT DOCUMENTS

| | | |
|---|---|---|
| JP | 2008-244974 A | 10/2008 |
| JP | 2010-286925 A | 12/2010 |
| JP | 2015-511341 A | 4/2015 |
| WO | 2013/018288 A1 | 2/2013 |

OTHER PUBLICATIONS

International Search Report for PCT Application No. PCT/JP2016/000824, dated May 10, 2016.
English translation of Written opinion for PCT Application No. PCT/JP2016/000824.
Japanese Office Action for JP Application No. 2017-501907 dated Mar. 31, 2020 with English Translation.

* cited by examiner

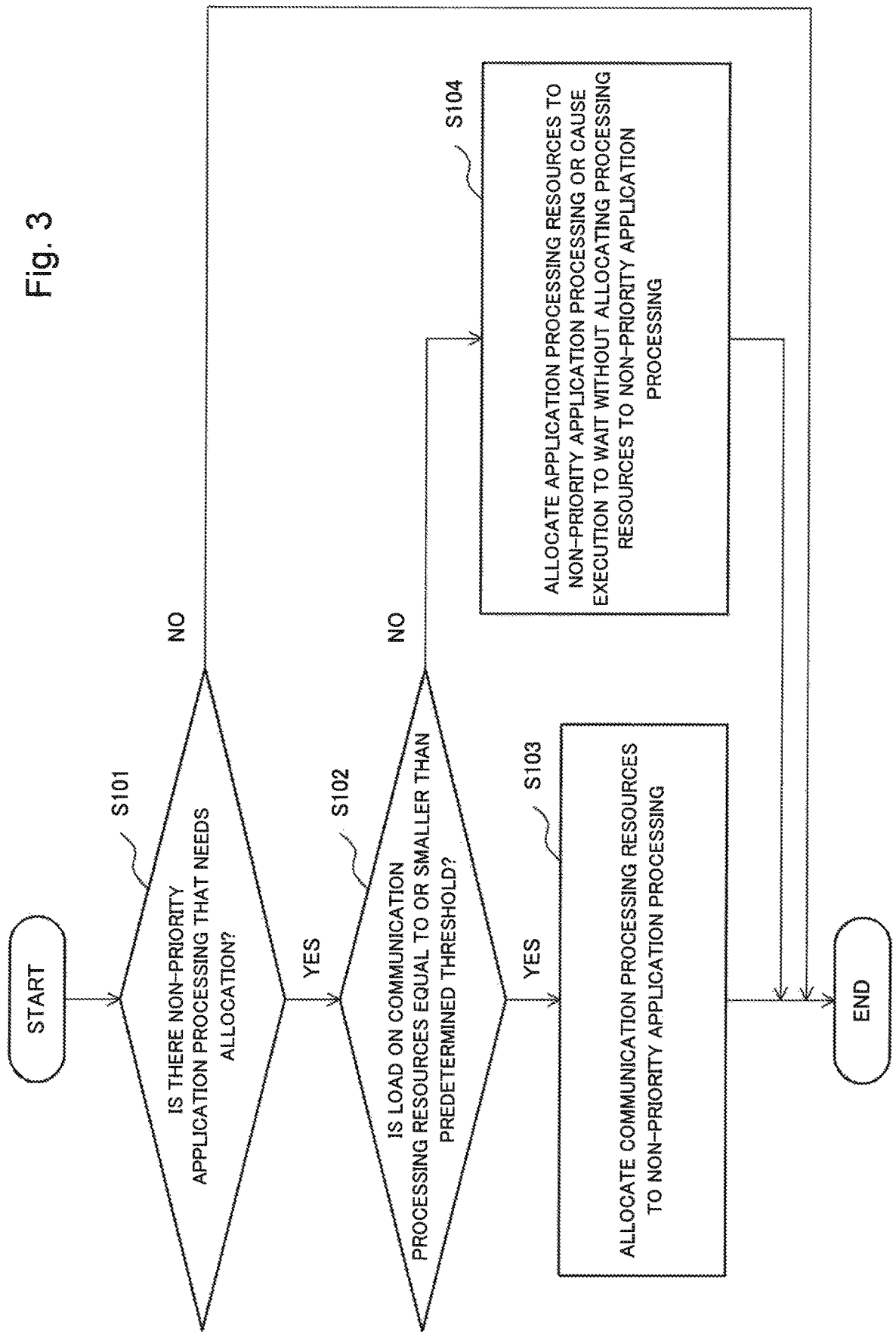

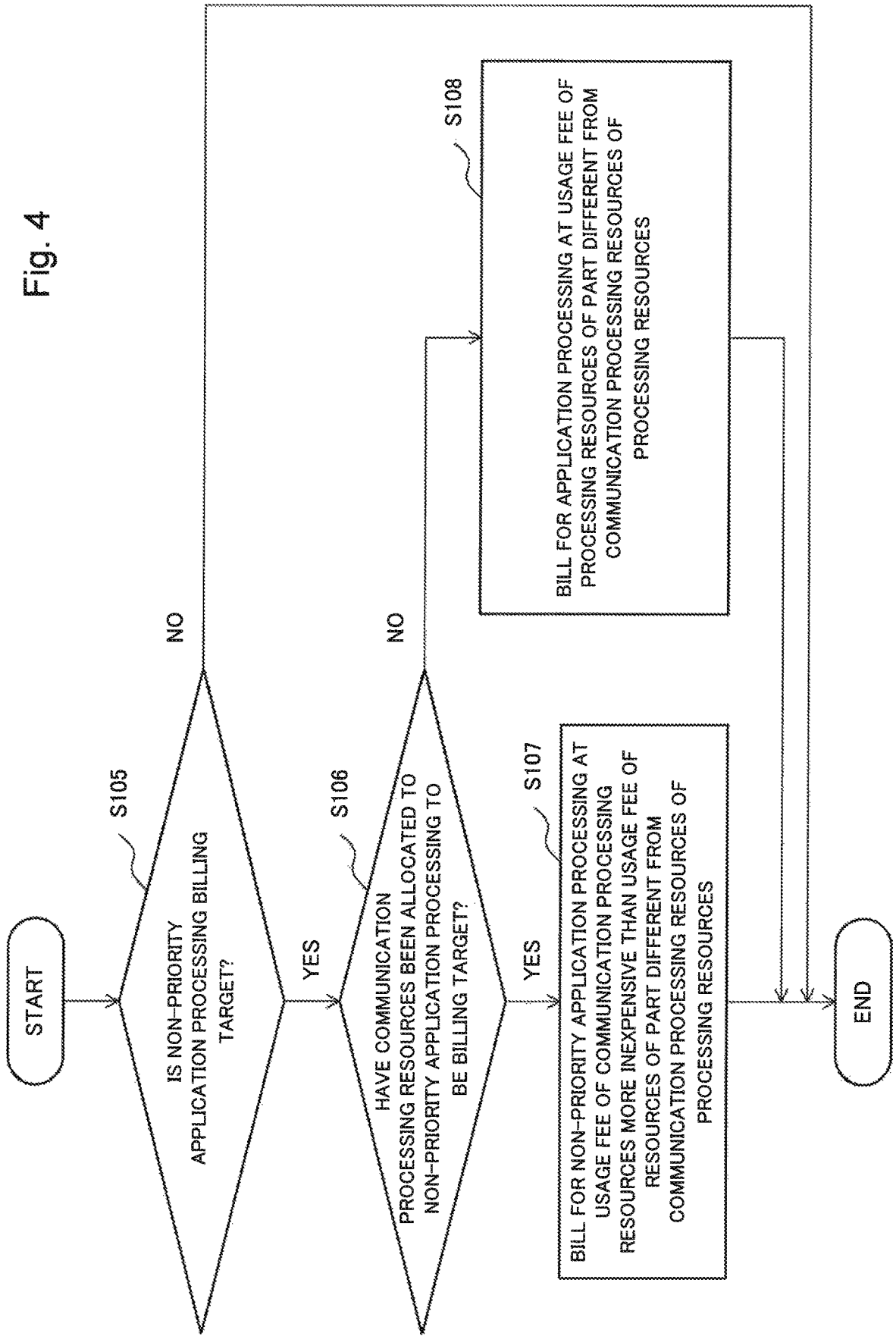

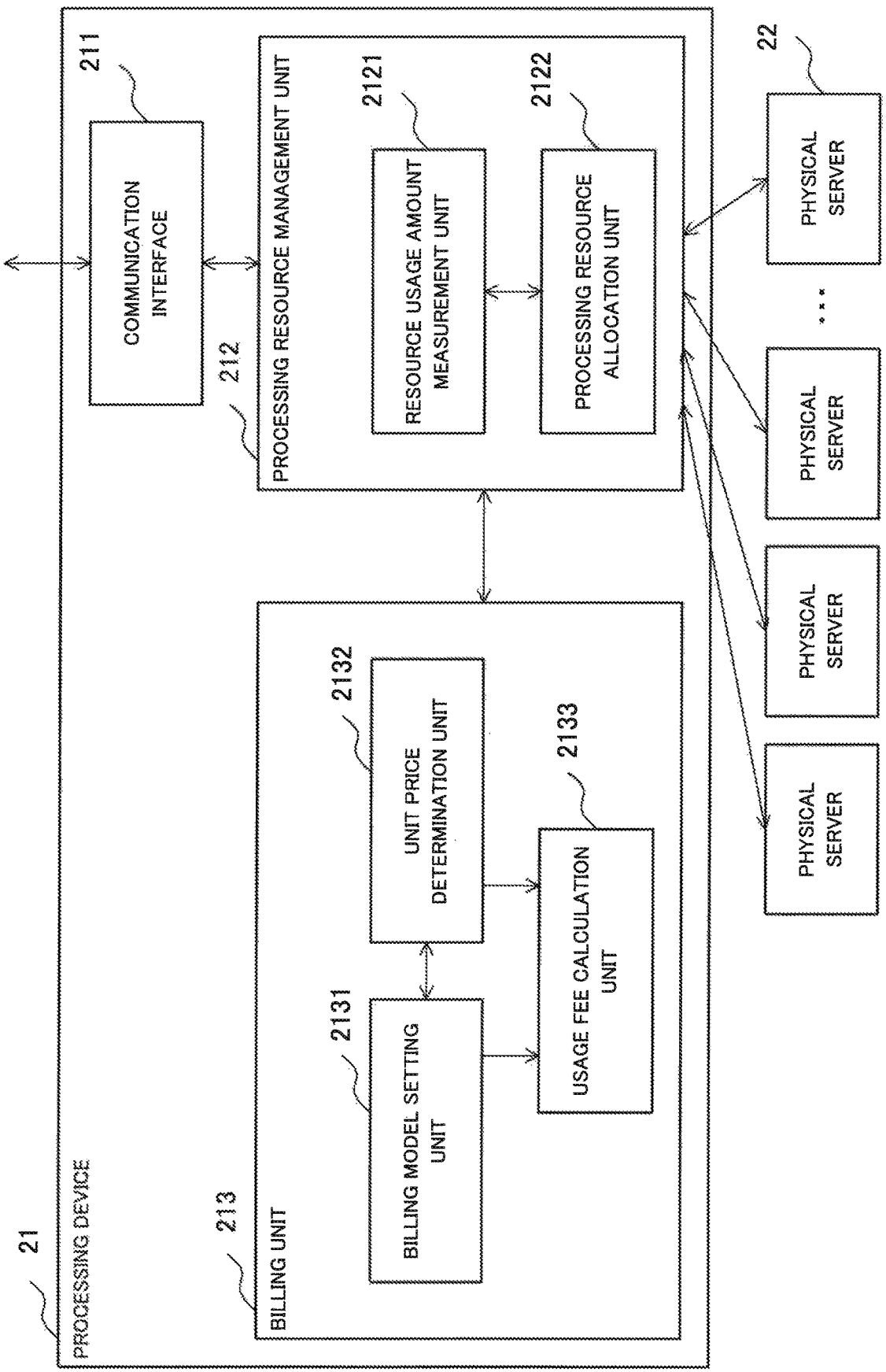

Fig. 6

| EXAMPLE OF BILLING MODEL | | | | | |
|---|---|---|---|---|---|
| COMMUNICATION PROCESSING AMOUNT-DEPENDENT MODEL | APPLICATION PROCESSING RESOURCES SURPLUS RATE | SURPLUS RATE: 0%-40% | SURPLUS RATE: 41%-60% | SURPLUS RATE: 61%-80% | SURPLUS RATE: 81%-100% |
| | UNIT PRICE (YEN/USAGE AMOUNT) | $X_V$ | $0.8 \times X_V$ | $0.7 \times X_V$ | $0.6 \times X_V$ |
| | COMMUNICATION PROCESSING RESOURCES | SURPLUS RATE: 0%-40% | SURPLUS RATE: 41%-60% | SURPLUS RATE: 61%-80% | SURPLUS RATE: 81%-100% |
| | UNIT PRICE (YEN/USAGE AMOUNT) | $0.5 \times X_V$ | $0.4 \times X_V$ | $0.3 \times X_V$ | $0.2 \times X_V$ |

Fig. 7

| EXAMPLE OF BILLING MODEL | | SURPLUS RATE OF ENTIRE PROCESSING RESOURCES: 0%–30% | SURPLUS RATE OF ENTIRE PROCESSING RESOURCES: 31%–60% | SURPLUS RATE OF ENTIRE PROCESSING RESOURCES: 61%–80% | SURPLUS RATE OF ENTIRE PROCESSING RESOURCES: 81%–100% |
|---|---|---|---|---|---|
| ENTIRE PROCESSING AMOUNT-DEPENDENT MODEL | APPLICATION PROCESSING RESOURCES | | | | |
| | USAGE UNIT PRICE | $X_V$ | $0.8 \times X_V$ | $0.7 \times X_V$ | $0.6 \times X_V$ |
| | COMMUNICATION PROCESSING RESOURCES | | | | |
| | USAGE UNIT PRICE | $0.5 \times X_V$ | $0.4 \times X_V$ | $0.3 \times X_V$ | $0.2 \times X_V$ |
| TIME ZONE-DEPENDENT MODEL | APPLICATION PROCESSING RESOURCES TIME ZONE | TIME ZONE: 2:00–6:00 | TIME ZONE: 6:00–18:00 | TIME ZONE: 18:00–23:00 | TIME ZONE: 23:00–2:00 |
| | USAGE UNIT PRICE | $0.6 \times X_V$ | $0.8 \times X_V$ | $X_V$ | $0.7 \times X_V$ |
| | COMMUNICATION PROCESSING RESOURCES | TIME ZONE: 2:00–6:00 | TIME ZONE: 6:00–18:00 | TIME ZONE: 18:00–23:00 | TIME ZONE: 23:00–2:00 |
| | USAGE UNIT PRICE | $0.2 \times X_V$ | $0.4 \times X_V$ | $0.5 \times X_V$ | $0.3 \times X_V$ |
| USAGE POWER AMOUNT-DEPENDENT MODEL | APPLICATION PROCESSING RESOURCES POWER AMOUNT | POWER AMOUNT: 0kWh–70kWh | POWER AMOUNT: 70kWh–170kWh | POWER AMOUNT: 170kWh–270kWh | POWER AMOUNT: 270kWh– |
| | USAGE UNIT PRICE | $0.6 \times X_V$ | $0.7 \times X_V$ | $0.8 \times X_V$ | $X_V$ |
| | COMMUNICATION PROCESSING RESOURCES | POWER AMOUNT: 0kWh–70kWh | POWER AMOUNT: 70kWh–170kWh | POWER AMOUNT: 170kWh–270kWh | POWER AMOUNT: 270kWh– |
| | USAGE UNIT PRICE | $0.2 \times X_V$ | $0.3 \times X_V$ | $0.4 \times X_V$ | $0.5 \times X_V$ |

FLAG MANAGEMENT FOR EACH
SUBROUTINE/FUNCTION

FLAG MANAGEMENT FOR EACH INTERRUPT EVENT
PROCESSING

Fig. 15

| EXAMPLE OF BILLING MODEL | | | | | |
|---|---|---|---|---|---|
| COMMUNICATION PROCESSING AMOUNT-DEPENDENT MODEL | PROCESSING RESOURCES | SURPLUS RATE: 0%–40% | SURPLUS RATE: 41%–60% | SURPLUS RATE: 61%–80% | SURPLUS RATE: 81%–100% |
| | UNIT PRICE (YEN/USAGE AMOUNT) | $X_V$ | $0.5 \times X_V$ | $0.3 \times X_V$ | $0.2 \times X_V$ |
| ENTIRE PROCESSING AMOUNT-DEPENDENT MODEL | PROCESSING RESOURCES | SURPLUS RATE: 0%–30% | SURPLUS RATE: 31%–60% | SURPLUS RATE: 61%–80% | SURPLUS RATE: 81%–100% |
| | UNIT PRICE (YEN/USAGE AMOUNT) | $X_V$ | $0.5 \times X_V$ | $0.3 \times X_V$ | $0.2 \times X_V$ |
| TIME ZONE-DEPENDENT MODEL | PROCESSING RESOURCES | TIME ZONE: 18:00–23:00 | TIME ZONE: 6:00–18:00 | TIME ZONE: 23:00–2:00 | TIME ZONE: 2:00–6:00 |
| | UNIT PRICE (YEN/USAGE AMOUNT) | $X_V$ | $0.8 \times X_V$ | $0.3 \times X_V$ | $0.2 \times X_V$ |
| USAGE POWER AMOUNT-DEPENDENT MODEL | PROCESSING RESOURCES | POWER AMOUNT: 270kWh– | POWER AMOUNT: 170kWh–270kWh | POWER AMOUNT: 70kWh–170kWh | POWER AMOUNT: 0kWh–70kWh |
| | UNIT PRICE (YEN/USAGE AMOUNT) | $X_V$ | $0.5 \times X_V$ | $0.3 \times X_V$ | $0.2 \times X_V$ |

APPLICATION PROCESSING RESOURCES — COMMUNICATION PROCESSING RESOURCES

PROCESSING DEVICE, PROCESSING DEVICE CONTROL METHOD, AND RECORDING MEDIUM

This application is a National Stage Entry of PCT/JP2016/000824 filed on Feb. 17, 2016, which claims priority from Japanese Patent Application 2015-037158 filed on Feb. 26, 2015, the contents of all of which are incorporated herein by reference, in their entirety.

TECHNICAL FIELD

The disclosed subject matter relates to a processing device and a processing device control method.

BACKGROUND ART

A demand for large-scale data processing/breakdown/analysis for big data, M2M (Machine to Machine) and the like is increasing. As one mechanism for processing such large-scale data, cloud computing is used. The cloud computing has a mode in which, for example, a large-scale processing device having acquired a service request from a user via the Internet referred to as a cloud executes processing for the request and provides the service to the user via the cloud.

The demand for this large-scale data processing is also increasing in the field of mobile communication systems. Data traffic of mobile communication systems is explosively increasing with rapid popularization and the like of smartphones and tablet terminals. To cope with such an increase in data traffic, 2007 World Radiocommunication Conference (WRC) internationally reached an agreement that a 3.5 GHz band and the like are ensured as frequency bands for 4G (4th Generation) such as LTE (Long Term Evolution)-Advanced and the like. Therefore, it is predicted that these new frequency bands will be allocated to 4G and 5G (5th Generation) in the future. Further, as measures for increasing a traffic capacity of an entire system, a heterogeneous network configuration in which a plurality of small cell base stations are installed in a coverage area of a macro cell base station, high-density installation of small cell base stations, and the like are studied.

Traffic for each radio base station may vary hourly, also depending on an installation place thereof. It is possible that, for example, in an office area and a commercial area, traffic peaks in the daytime that is a working time zone and an outing time zone, but in a residential area, traffic peaks from evening to night after returning home. Further, in both areas, traffic may decrease at midnight. In an existing mobile communication system, processing resources have been implemented in accordance with a peak of data traffic (i.e. in such a way as to be processable even at a peak of data traffic) in each coverage area with respect to each of radio base stations. Herein, the processing resource is a processor such as a CPU (Central Processing Unit), a storage device such as a memory, and a hard disk, and the like included in a processing device such as a radio base station, and is reworded as a computer resource, a computational resource, a calculation resource, and the like. Processing resources in a radio base station in the existing mobile communication system have generally operated even when data traffic decreases, due to a reason for coping with a rapid processing amount increase and the like. Therefore, an architecture referred to as C-RAN (Radio Access Network) (Centralized-RAN, Cloud-RAN) or BB (Baseband)-Pooling in which some of processes of a radio communication processing unit such as baseband signal processing for a plurality of radio base stations are centralized in one radio base station device or a control device of a higher level connected to a radio base station has been proposed. One concept of a C-RAN architecture is that centralized processing resources of a radio communication processing unit are subject to efficient resource sharing among a plurality of base stations, and thereby cost reduction and power consumption reduction of a base station device are made possible.

Technology for operating one or a plurality of virtual servers on a single physical server (calculator) is also known. This technology is referred to as, for example, a server virtualization technology. Further, the virtual server is referred to also as a Virtual Machine (VM). Respective virtual machines can cause OSs (Operating Systems) separate from each other to operate independently. The server virtualization technology divides various types of computer resources such as a processor, a memory, and a storage device included in a physical server into respective virtual machines to be allocated thereto. When, for example, a plurality of processes are allocated to respective virtual machines and the processes are executed in parallel, limited computer resources included in a physical server can be effectively used.

On the other hand, with an increase in data traffic, a demand for latency reduction in an application processing, and the like, attention has been focused on a processing technology referred to as edge computing (edge processing) that executes an application processing in a vicinity of a communication processing device, closer to a terminal (a user), such as, for example, a radio base station in a mobile communication system, instead of cloud processing using a large-scale server possessed by a cloud operator. As one example of edge computing, cited is an example in which in a center unit of C-RAN in which some communication processings such as baseband processing for a plurality of radio base stations are centralized, an application processing is also executed along with a communication processing. Thereby, processing can be executed at lower latency than in cloud processing. In this case, in a communication processing device such as a radio base station, a communication processing server and an application processing server for edge processing coexist.

In such an area such as edge computing (edge processing), it may be necessary to effectively use a communication processing server and an application processing server on a communication processing device such as, for example, a radio base station, and a core network device. Further, in general, a communication processing device such as a radio base station, and a core network device is managed by a communication carrier, and therefore to commercialize an edge processing application on the communication processing device by an application provider, it may be necessary to rent an application processing server from the communication carrier.

As such a method for effectively using processing resources on a communication processing device and a method for renting resources (a usage fee setting method), several related arts have been proposed.

In PTL 1, technology for fairly billing a user according to a used communication band has been proposed.

Further, in PTL 2, technology for enabling surplus free resources to be borrowed by a device among communication processing devices and communication devices from another device among the devices, depending on a load (usage amount) state of hardware resources has been proposed.

Further, in "Section 6.5. Edge Applications on C-RAN" of NPL 1, technology for physically sharing a communication processing server in a base station device and an application processing server for edge processing on the base station device by using virtualization technology or the like has been proposed. Thereby, using general-purpose server resources (processing resources), a communication processing for mobile communication and an application processing for an edge application can be shared. Therefore, technology for physically sharing the server is capable for realization at lower cost than in a case where a dedicated device is installed. Further, when timings when both a communication processing and an application processing peak are different, effective use of installed server resources can be expected.

CITATION LIST

Patent Literature

PTL 1: Japanese Laid-open Patent Publication No. 2004-173170
PTL 2: Japanese Laid-open Patent Publication No. 2008-244974

Non Patent Literature

NPL 1: China Mobile Research Institute, "C-RAN, The road towards green RAN", Ver. 3.0, December 2013

SUMMARY OF INVENTION

Technical Problem

However, these related arts produce the following problems.

With regard to PTL 1, there is a problem that, while fairness is realized among users in a point that a usage fee can be set according to a used resource amount, a communication carrier needs facility installation with an assumption of a use peak of a communication band.

Further, with regard to PTL 2, free resource information is notified among a plurality of communication processings, and thereby free resources can be effectively used. However, from the viewpoint of characteristics of a communication processing, it is generally undesirable to delay a processing timing. Therefore, there is a problem that effective use of free resources between any devices among communication processing devices and communication devices is limited to a case where peaks of processes of each other are different. In other words, in such a case where peaks of communication processings of each other occur at the same timing, there are no free resources in both devices, and therefore there is a problem that it is difficult to effectively use free resources. Therefore, it is necessary for a communication carrier to install processing resources with an assumption of both communication processing peaks.

Further, with regard to NPL 1, an application processing for an edge application may be executed along with communication with a terminal (a user) connected to the communication processing device. In this case, the application processing for the edge application accompanied with a communication processing in the communication processing device may be executed in connection with the communication processing. Therefore, it is necessary for a communication carrier to perform facility installation of server resources, assuming a possibility that both processing peaks occur at the same timing.

In other words, in these related arts, while it is possible to effectively use free resources (surplus resources), an application processing is frequently executed along with a communication processing, and therefore timings of peaks of the processes are overlapped, resulting in limitation in effective use of surplus resources. Therefore, there is a problem that a communication carrier needs capital investment and the like, on the premise that processing resources are not effectively used (i.e. when processing resources are surplus, both resources for a communication processing and an application processing become surplus, and at a processing peak, both processes peak).

Object of Invention

In view of the problems, the disclosed subject matter has been achieved, and one object of the disclosed subject matter is to provide a processing device and the like that contribute to effective use of processing resources such as server resources becoming surplus in association with temporal/spatial uneven distribution of a communication processing.

Solution to Problem

According to a first aspect of the disclosed subject matter, a processing device is provided. The processing device allocates processing resources to at least a communication processing and an application processing and executes at least the communication processing and the application processing.

The processing device includes a communication interface that transmits/receives data associated with the communication processing; and at least one processor that operates to execute at least a scheduling processing that allocates communication processing resources that are at least a part of the processing resources to the communication processing in a preferential manner and a billing processing that bills a user of the application processing according to a usage amount of processing resources used for the application processing.

The application processing includes a non-priority application processing processable in a non-preferential manner.

The scheduling processing in the processor is capable of allocating, when a load on the communication processing resources allocated to the communication processing does not reach a predetermined threshold, the communication processing resources to the non-priority application processing. And, the billing processing in the processor bills for the non-priority application processing at a usage fee of the communication processing resources more inexpensive than a usage fee of resources of a part different from the communication processing resources of the processing resources.

According to a second aspect of the disclosed subject matter, a control method, for a processing device that allocates processing resources to at least a communication processing and an application processing and executes at least the communication processing and the application processing, is provided.

The control method includes allocating communication processing resources that are at least a part of the processing resources to the communication processing in a preferential manner and billing a user of the application processing according to a usage amount of processing resources used for the application processing.

The application processing including a non-priority application processing processable in a non-preferential manner.

When a load on the communication processing resources allocated to the communication processing does not reach a predetermined threshold, the communication processing resources are capable of being allocated to the non-priority application processing.

A usage fee of the communication processing resources more inexpensive than a usage fee of resources of a part different from the communication processing resources of the processing resources is billed for the non-priority application processing.

Advantageous Effects of Invention

According to the disclosed subject matter, it is possible to contribute to effective use of processing resources such as server resources becoming surplus in association with temporal/spatial uneven distribution of a communication processing.

BRIEF DESCRIPTION OF DRAWINGS

FIG. 3 is a first flowchart illustrating an operation example of the processing device of the first example embodiment.

FIG. 4 is a second flowchart illustrating an operation example of the processing device of the first example embodiment.

FIG. 5 is a block diagram illustrating a configuration example of a processing device in a second example embodiment.

FIG. 6 is a diagram illustrating an example of a billing model.

FIG. 7 is a diagram illustrating an example of a billing model.

FIG. 15 is a diagram illustrating an example of a billing model.

DESCRIPTION OF EMBODIMENTS

Figure 1:
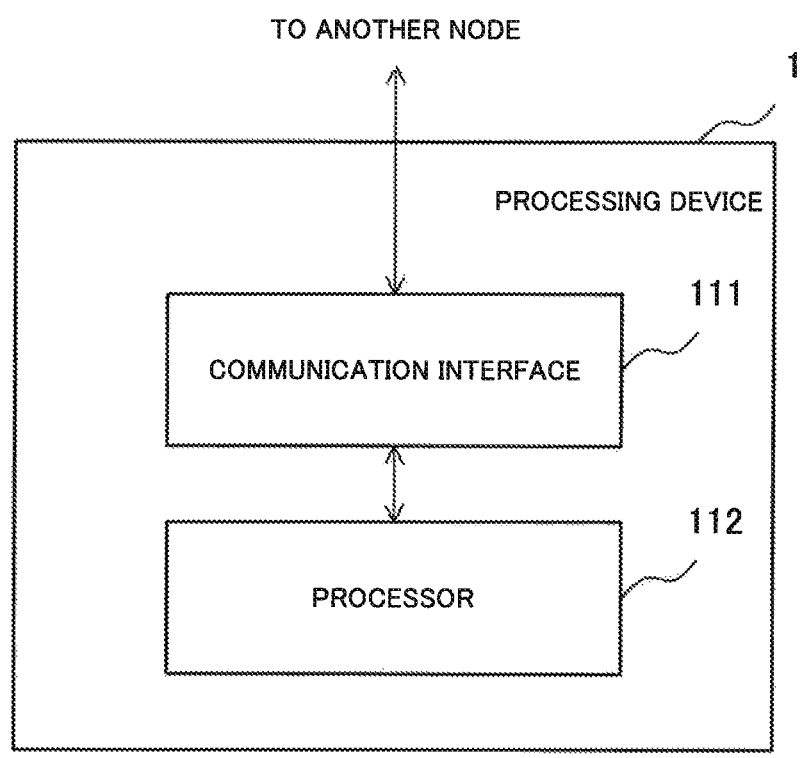
FIG. 1 is a block diagram illustrating a configuration example of a processing device in a first example embodiment.

Example embodiments applied with the disclosed subject matter will be described below in detail with reference to the accompanying drawings. In the drawings, the same components are assigned with the same reference signs, and therefore overlapping description will be omitted for description clarification except for necessary cases.

First Example Embodiment

[Configuration]

FIG. 1 is a block diagram illustrating a configuration example of a processing device 1 in a first example embodiment. Herein, the processing device 1 is a processing device that allocates processing resources to at least a communication processing and an application processing and executes at least the communication processing and the application processing. The processing device 1 may be a node in a mobile communication system. In other words, the processing device 1 may be a radio base station including a function of executing an application processing or a node of a core network.

Herein, the processing device 1 in FIG. 1 includes a communication interface 111 and a processor 112. In FIG. 1, of function blocks included in the processing device 1, specifically, components that are feature parts of the present example embodiment are illustrated. In other words, the processing device 1 also includes a function block, not illustrated, that causes the processing device 1 to function as a processing device that allocates processing resources to at least a communication processing and an application processing and executes at least the communication processing and the application processing.

The communication processing includes processing relating to a communication protocol between devices. The communication processing may include, for example, at least one of radio communication processing, packet processing, routing processing, switch processing, or authentication. Further, the communication processing may be a process for setting a communication channel or a process for initiating/terminating communication.

Specific examples of the communication processing will be briefly described. For example, the routing processing includes dynamic routing and static routing. The authentication includes, as an example, Basic authentication defined by HTTP (Hyper Text Transfer Protocol). Further, the process for initiating/terminating communication includes 3 way-handshake that is a communication initiation procedure of TCP (Transmission Control Protocol).

Further, the radio communication processing may include processing of layer 1 such as baseband signal processing, processing of layer 2 such as Radio Link Control, radio resource scheduling, and MAC (Medium Access Control) processing, and processing of layer 3 such as Radio Resource Control, and Radio Resource Management, as well as C-Plane (Control-Plane) processing, U-Plane (User-Plane) processing, call processing, and mobility processing.

On the other hand, the application processing includes processing relating to execution of an application. The application processing may include, for example, image processing, voice processing, video processing, image authentication, biometric authentication, video distribution, arithmetic processing for robot control, arithmetic processing for system control, arithmetic processing for self-driving control, fault detection processing, natural language processing, machine learning processing, data analysis processing, data update processing, and maintenance processing.

Further, the application processing includes a real-time process and a batch process. The real-time process is a process needed to be executed in a predetermined time when a processing request for data is made. The real-time process needs to be processed in real time and therefore is a process to be executed in a preferential manner, and a real-time process in an application processing can be also reworded as a priority application processing. The predetermined time herein can be reworded as an allowable time or a delay time. On the other hand, the batch process is a process for collecting data of a certain period or a certain amount and then collectively executing processing for the data. The batch process indicates, for example, a process for dividing a program group for each processing purpose by using a computer and sequentially executing processing for each division. The batch process does not need to be processed in real time and therefore can be also reworded as a non-priority application processing.

The priority application processing may be an application processing accompanied with a communication processing for a network (i.e. the outside of an own processing device), and the non-priority application processing may be an application processing that is not accompanied with a communication processing with a network.

For example, image authentication, biometric authentication, video distribution, arithmetic processing for robot control, arithmetic processing for system control, arithmetic processing for self-driving control, and fault detection processing may be included in a priority application processing. Further, natural language processing, machine learning processing, data analysis processing, data update processing, and maintenance processing may be included in a non-priority application processing. Image processing, voice processing, and video processing are divided into a priority application processing or a non-priority application processing, depending on whether it is necessary to be executed in a predetermined time of a processing request for data.

For more detail, each application processing exemplified may be executed by being divided into a main routine and a subroutine on a program. Therefore, whether it is necessary to be executed in real time may be different for each routine. Therefore, whether each application processing is a priority application processing or a non-priority application processing is identified according to whether it is necessary to execute each routine in real time, and thereby the present example embodiment may be applied. In the same manner, each application processing may be executed by a plurality of processes. Therefore, whether it is necessary to be executed in real time may be different for each process. Therefore, whether each application processing is a priority application processing or a non-priority application processing is identified according to whether it is necessary to execute each process in real time, and thereby the present example embodiment may be applied.

A processing resource is, as described above, a processor such as a CPU (Central Processing Unit), a storage device such as a memory, and a hard disk, and the like, and is reworded as a computer resource, a computational resource, a calculation resource, a server resource, and the like.

The processing resource herein may be included in the processing device 1 or may not be included in the processing device 1. For example, the processing device 1 may execute a communication processing and an application processing by using processing resources inside another processing device such as a physical server connected to the processing device 1.

Further, there may be one processing resource or a plurality of processing resources. For example, a plurality of memories included in the processing device 1 may be used as processing resources. Further, a processor included in the processing device 1 may be used as a processing resource. Further, a plurality of physical servers connected to the processing device 1 may be used as processing resources (server resources). Further, at least one virtual machine virtually constructed by executing, by using a processor, a program stored on a memory may be used as a processing resource. The communication interface 111 of the processing device 1 in FIG. 1 transmits/receives data associated with a communication processing. More specifically, by an instruction from a processor that operates to execute processing in accordance with a communication protocol, the communication interface 111 transmits/receives data to/from another node. Herein, the communication interface 111 may include a communication cable such as an optical fiber, an antenna, a transmission/reception amplifier, and the like.

The processor 112 operates to execute at least the following two processes. A first process is a scheduling processing that allocates communication processing resources that are at least a part of processing resources to a communication processing in a preferential manner. A second process is a billing processing that bills a user of an application processing according to a usage amount of processing resources used for the application processing. The user of an application processing is, for example, an application provider or an OTT (Over The Top) provider.

As a specific example of the scheduling processing, when a processing resource is a memory, a capacity (unit: byte) of a part of the memory is allocated to a communication processing as a communication processing resource in a preferential manner.

As a specific example of the billing processing, when a processing resource is a memory, a billing amount of money (a usage fee of the processing resource) is determined according to a capacity of the memory used for an application processing.

More specifically, it is possible that, for a capacity of a memory used for an application processing, one or a plurality of thresholds are set, and according to whether a usage amount of the memory in a predetermined time interval (e.g. an average value or a maximum value in a predetermined time interval) exceeds the threshold, a billing amount of money different for each predetermined time interval is determined. Further, a billing amount of money may be determined by multiplying, for each predetermined time interval, a usage fee (unit price) of processing resources per unit time/unit capacity, a usage amount of the memory, and a usage time of the memory. Further, a billing amount of money may be determined by multiplying a usage fee (unit price) of processing resources per unit time and a usage time of the memory for each predetermined time interval.

When, for example, an average value of usage amounts of processing resources used in a predetermined time: T (time) is set as V (capacity) and a unit price of a processing resource usage fee when used is set as Xv (yen/capacity/time), a billing amount of money X in the predetermined time T can be represented as $X = Xv \times V \times T$.

Figure 2:
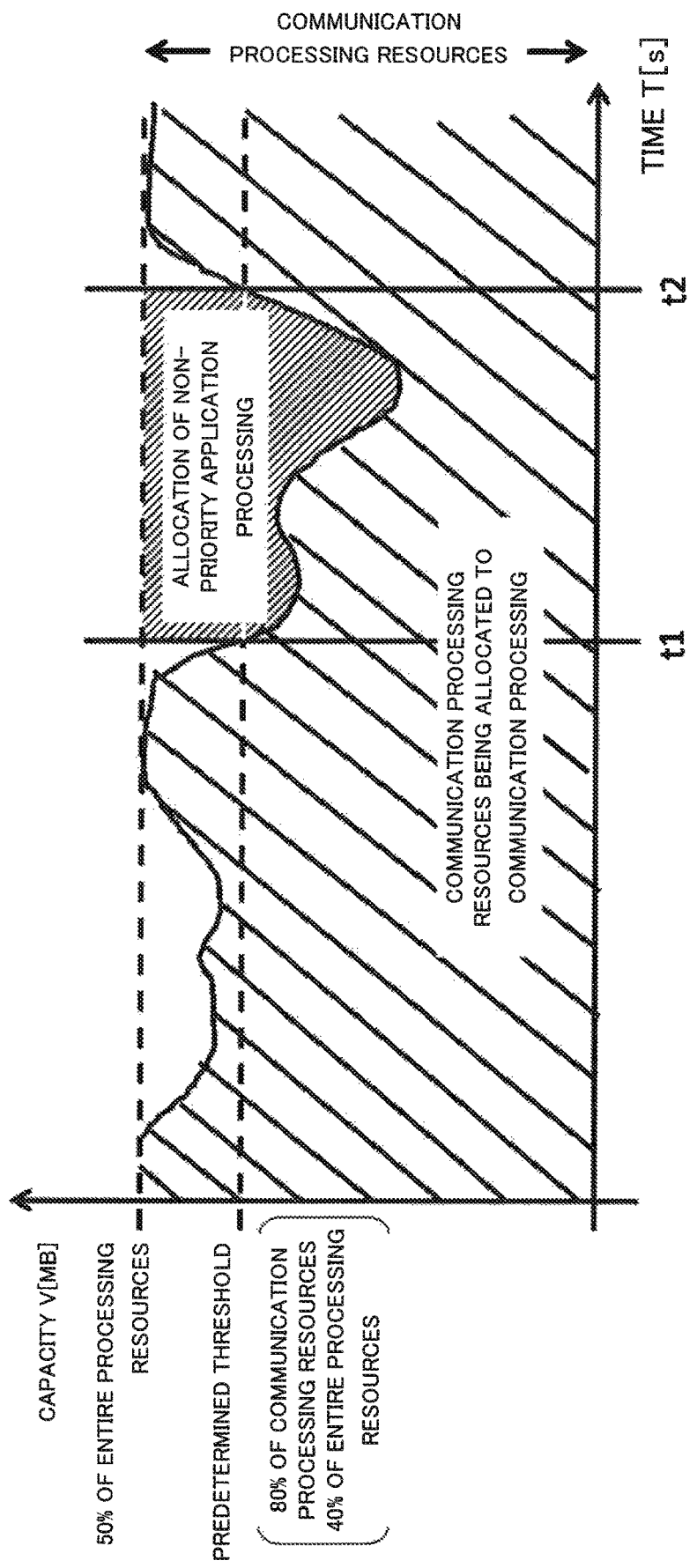
FIG. 2 is a diagram illustrating a relation between a capacity and a time of processing resources.

Further, the processor 112 can also further operate, as a scheduling processing, to assign a non-priority application processing to the communication processing resources, when a load on communication processing resources allocated to a communication processing does not reach a predetermined threshold. As an example, a case in which communication processing resources are allocated as 50% of the entire capacity of one memory and a predetermined threshold is 80% of the communication processing resources (40% of the entire capacity of one memory) will be described using FIG. 2. FIG. 2 is a diagram illustrating a relation between a capacity and a time of processing resources relating to assignment of a non-priority application processing to communication processing resources. The processor 112 measures a usage rate of communication processing resources for each predetermined time. In FIG. 2, the processor 112 operates to measure a usage rate of communication processing resources at a clock time t1, determine that a usage rate of the communication processing resources used for a communication processing is equal to or smaller than 80%, and allocate remaining surplus communication processing resources to a non-priority application processing. This allocation processing is executed until a clock time t2 when a usage rate of the communication processing resources exceeds a predetermined threshold (80% of the communication processing resources). The clock time t2 may be a time when a predetermined time for again measuring a usage rate of the communication processing resources after t1 has elapsed. Further, the processor 112 may always monitor a usage rate of the communication processing resources from initiation time of the allocation processing and set, as t2, a clock time when the usage rate of the communication processing resources exceeds a predetermined threshold (80% of the communication processing resources).

All surplus communication processing resources may not be allocated to a non-priority application processing. In FIG. 2, for example, only a 20% part of communication processing resources (i.e. a certain amount of communication processing resources) (a 10% part of all processing resources) that is at least surplus in a period from t1 to t2 may be allocated to a non-priority application processing.

Herein, the non-priority application processing is, for example, a batch process in the above-described application processing. Further, it is possible to allocate resources that are a part different from communication processing resources of processing resources, as application processing resources that can be allocated to an application processing including a non-priority application processing in a preferential manner, to the process, and execute the process. Hereinafter, for description simplification, the resources that are a part different from communication processing resources of processing resources may be described as application processing resources that can be allocated to an application processing in a preferential manner.

The processor 112 further operates, as a billing processing, to bill for a non-priority application processing at a usage fee of communication processing resources more inexpensive than a usage fee of application processing resources. As described above, the non-priority application processing can be assigned to application processing resources and communication processing resources. Therefore, billing is performed in such a way that a resource usage fee upon allocating communication processing resources to a non-priority application processing and executing the process becomes more inexpensive than in a case of allocating application processing resources to the non-priority application processing and executing the process. For example, it is assumed that a unit price of a resource usage fee upon allocating application processing resources to a non-priority application processing and executing the process is Xv (yen/capacity/time), and that a unit price of a resource usage fee upon allocating communication processing resources to the non-priority application processing and executing the process is Xv×0.5 (yen/capacity/time). Thereafter, a calculated unit price of the resource usage fee, a usage amount of processing resources, and a usage time are multiplied, and a usage fee to be billed to a user is calculated.

A specific example of calculation of a resource usage fee to be billed to a user of an application processing will be described below. In FIG. 2, for example, an average value (or a maximum value) "V=20 MB (megabytes)" of usage amounts of communication processing resources allocated to a non-priority application processing from clock times t1 to t2 is multiplied by a unit price (yen/capacity/time) of a resource usage fee and a time T from the clock times t1 to t2, and thereby a resource usage fee X can be determined. In other words, when it is assumed that a unit price of a usage fee of application processing resources is "Xv=3 yen/MB/minute" and a time from clock times t1 to t2 is "30 minutes," a usage fee X of the application processing resources for a non-priority application processing is determined as X=Xv×V×T=3×20×30=1800 (yen). On the other hand, when it is assumed that a unit price of a usage fee of communication processing resources is "Xv×0.5=3×0.5 (yen/MB/minute), a usage fee of the communication processing resources for a non-priority application processing is determined as $$X=(Xv\times0.5)\times V\times T=(3\times0.5)\times20\times30=900 \text{ (yen)}.$$

When a resource usage fee upon allocating communication processing resources to a non-priority application processing and executing the process is more inexpensive than a usage fee in a case of allocating application processing resources to the non-priority application processing and executing the process, the usage fee may be a fixed amount. As an example of the fixed amount, when it is assumed that a usage fee upon allocating application processing resources to a non-priority application processing and executing the process is "a monthly amount of Y yen," a resource usage fee upon allocating communication processing resources to the non-priority application processing and executing the process may be set as "a monthly amount of Y×0.5 yen." In this case, both a usage fee (a monthly amount) of the application processing resources and a usage fee (a monthly amount) of the communication processing resources may be billed for the non-priority application processing. Therefore, when a contract concerning use of an application processing with a user of the application processing is established, it may be recommended that use of only application processing resources or communication processing resources be selectable for at least one or a specific non-priority application processing.

The processor 112 may operate to execute another process. When, for example, there are free parts in a usage amount and a usage time of the processor resulting from a scheduling processing and a billing processing, a communication processing and an application processing may be executed using the free usage amount and usage time as processing resources.

[Operation]

Next, using flowcharts of FIG. 3 and FIG. 4, an operation example of the processing device 1 of the present example embodiment will be described.

In FIG. 3, the processing device 1 determines whether there is a non-priority application processing that needs to be allocated with processing resources (step S101).

The processing device 1 determines, when determining that there is a non-priority application processing that needs allocation in step S101 (step S101, YES), whether a load on communication processing resources is equal to or smaller than a predetermined threshold (step S102). On the other hand, when it is determined that there is no non-priority application processing that needs allocation in step S101 (step S101, NO), the processing is terminated.

The processing device 1 allocates, when determining that the load on communication processing resources is equal to or smaller than the predetermined threshold in step S102 (step S102, YES), communication processing resources to the non-priority application processing (step S103). On the other hand, when determining that the load on communication processing resources is not equal to or smaller than the predetermined threshold in step S102 (step S102, NO), the processing device 1 allocates application processing resources to the non-priority application processing or causes the processing to wait without allocating processing resources to the non-priority application processing (step S104). Step S104 is not necessary processing, and when step S104 does not exist, the same operation may be executed as in the case of causing the processing to wait without allocating processing resources to the non-priority application processing. Further, before or after steps S103 and S104, processing for allocating application processing resources to a priority application processing may be executed. In the same manner, before or after steps S103 and S104, processing for allocating communication processing resources to a communication processing may be executed.

Next, in FIG. 4, the processing device 1 determines whether a non-priority application processing assigned to processing resources is a billing target (step S105).

The processing device 1 determines, when determining that the non-priority application processing is a billing target in step S105 (step S105, YES), whether communication processing resources have been allocated to the non-priority application processing to be a billing target (step S106). On the other hand, when it is determined that the non-priority application processing is not a billing target (step S105, NO), the processing is terminated. When a billing target is a priority application processing in step S105, NO, a usage fee of application processing resources may be billed for the priority application processing.

The processing device 1 bills, when determining that communication processing resources have been allocated to the non-priority application processing to be a billing target (step S106, YES), for the non-priority application processing at a usage fee of the communication processing resources more inexpensive than a usage fee of resources of a part different from the communication processing resources of the processing resources (step S107).

On the other hand, the processing device 1 bills, when determining that communication processing resources have not been allocated to the non-priority application processing to be a billing target (step S106, NO), for an application processing at a usage fee of resources of a part different from the communication processing resources of the processing resources (step S108). The resources of a part different from the communication processing resources of the processing resources herein may be application processing resources.

Advantageous Effects

In the present example embodiment, when a load on communication processing resources does not reach a predetermined threshold, the processing device 1 can allocate communication processing resources to a non-priority application processing and bills for the non-priority application processing at a usage fee of the communication processing resources more inexpensive than a usage fee of resources of a part different from the communication processing resources of the processing resources. Surplus recourses of communication processing resources are allocated to a non-priority application processing, and thereby the surplus resources can be effectively used. Further, a usage fee of communication processing resources is billed for a non-priority application processing at an amount of money more inexpensive than a usage fee of application processing resources, and thereby a user of an application processing can be promoted to use surplus resources. Therefore, it is possible to contribute to effective use of surplus resources.

Second Example Embodiment

In a second example embodiment, a case in which processing resources are a plurality of physical servers connected to the processing device 1 and resources of a part different from communication processing resources of the processing resources are application processing resources that can be allocated to an application processing in a preferential manner will be described.

[Configuration]

FIG. 5 is a block diagram illustrating a configuration example of a processing device 21 in the second example embodiment. In the figure, the processing device 21 includes a communication interface 211, a processing resource management unit 212, and a billing unit 213. The processing resource management unit 212 includes a resource usage amount measurement unit 2121 and a processing resource allocation unit 2122. Further, the processing resource management unit 212 is connected to a plurality of physical servers 22. The billing unit 213 includes a billing model setting unit 2131, a unit price determination unit 2132, and a usage fee calculation unit 2133. The operations executed by the processor 112 in the first example embodiment are executed by function units such as the processing resource management unit 212, and the billing unit 213 that dedicatedly operate in the second example embodiment, but a processor may be caused to operate in the same manner as in the first example embodiment.

The communication interface 211 is the same as the communication interface 111 in the first example embodiment, and therefore description will be omitted herein.

Further, the processing resource allocation unit 2122 of the processing resource management unit 212 uses server resources (a CPU, a memory, and the like) of the physical servers 22 as processing resources and allocates the processing resources to a communication processing and an application processing. In other words, the processing resource management unit 212 manages the physical servers 22 by dividing the servers into application processing resources that execute an application processing in a preferential manner and communication processing resources that execute a communication processing in a preferential manner.

With regard to how many physical servers 22 are allocated as communication processing resources and application processing resources, various methods are employable. It is possible that, for example, first, the physical servers 22 to be allocated as communication processing resources are determined based on a maximum communication processing resource amount predicted from assumed maximum communication traffic, and thereafter the remaining physical servers 22 (processing resources) are allocated as application processing resources. Further, the resource usage amount measurement unit 2121 of the processing resource management unit 212 may statistically learn a processing resource usage amount of a communication processing and update setting of an optimum communication processing resource amount in every certain period. Further, as other methods, cited are determination methods based on characteristics (a user number, an application processing number per unit period with respect to one user, and the like) of users of application processings, a number of nodes that communicate with the processing device 21, and the like.

Further, the processing resource allocation unit 2122 also includes a processing distribution function of controlling whether a non-priority application processing in an application processing is executed using application processing resources or surplus resources of communication processing resources. In this case, the distribution may be executed, as described above, for each subroutine or process.

The resource usage amount measurement unit 2121 measures, at every predetermined time or any timing, an individual processing resource usage amount for each of an application processing and a communication processing, as well as, as necessary, a processing resource usage amount of the processing device 21 or the entire physical servers 22 connected to the processing device 21, usage amounts of the entire communication processing resources and the entire application processing resources, and the like. The resource usage amount measurement unit 2121 notifies the billing unit 213 of the measured processing resource usage amounts.

The following description will be made, assuming that, although not illustrated, the processing resource management unit 212 is divided into an application processing resource management unit that manages application processing resources and a communication processing resource management unit that manages communication processing resources.

The billing model setting unit 2131 of the billing unit 213 sets a billing model for each application processing operated by an application provider. A billing model may be set, for example, for each of image processing, voice processing, video processing, and the like that are examples of the application processing. Further, a billing model may be set for each subroutine and process. The billing model may be set for each application provided to a user or may be set for each application type. Further, a billing model may be set for each user or may be set commonly to applications and users.

In FIG. 6, an example of the billing model is illustrated. FIG. 6 is a diagram illustrating a model in which a usage unit price varies depending on which are used as resources for executing a (non-priority) application processing, application processing resources or (surplus resources of) communication processing resources. Herein, the billing model indicates a type of an explanatory variable, a number of ranges including a threshold, a threshold itself, and the like for determining usage fees of application processing resources for an application processing and surplus resources of communication processing resources. In FIG. 6, for example, a type of an explanatory variable, a number of thresholds in each processing resource, and a value of a threshold correspond to "communication processing resources," "4," and "a surplus rate: 0% to 40%," respectively.

The unit price determination unit 2132 determines a usage unit price of processing resources used for an application processing. In FIG. 6, for example, it is determined to which usage unit price such as "Xv," and "0.5×Xv," an application processing to be a billing target corresponds, based on a resource usage amount obtained from the resource usage amount measurement unit 2121. The usage unit price may be an amount of money per unit usage amount of processing resources or may be an amount of money per unit usage rate thereof.

The usage fee calculation unit 2133 calculates a billing amount of money (a usage fee of processing resources) to a user, based on a billing model set by the billing model setting unit 2131, a usage unit price determined by the unit price determination unit 2132 from a resource usage situation (a resource usage amount/rate or the like) for each application processing, a usage amount/rate of processing resources for each predetermined time interval, and a usage time of processing resources. The calculation method is the same as in the first example embodiment, and therefore description will be omitted herein.

While as a configuration of the second example embodiment, a case in which the processing resource management unit 212 is connected to a plurality of physical servers 22 has been described, a configuration in the second example embodiment is not limited to this configuration. It is possible that, for example, virtual machines virtually constructed by executing, by using a processor included in the processing device 21, programs stored on a memory included in the processing device 21 are used, instead of the physical servers 22. In other words, the virtual machines become processing resources in the present example embodiment.

Further, in the processing device 21, virtual machines constructed by a processor may execute a scheduling processing and a billing processing of processing resources.

[Operation]

An operation of the processing device 21 in the second example embodiment is basically the same as the operation of the processing device 1 in the first example embodiment illustrated in FIG. 3 and FIG. 4, but by considering that the second example embodiment is a detailed example of the first example embodiment, each step and other operations of the first example embodiment will be complemented as appropriate.

The processing device 21 in the second example embodiment executes processing for allocating communication processing resources to a communication processing before step S101 of FIG. 3 and executes processing for allocating application processing resources to an application processing.

More specifically, a communication processing resource management unit (not illustrated) in the processing resource management unit 212 basically executes resource management of a communication processing and executes process assignment to communication processing resources in a preferential manner. Further, the communication processing resource management unit also executes resource management for a non-priority application processing (e.g. a subroutine) distributed to surplus resources of communication processing resources by a processing distribution function. In this case, resource allocation to a communication processing is executed in a preferential manner, and processing resource allocation to a non-priority application processing in step S103 is executed in a lower preferential manner than for the communication processing.

Further, the application processing resource management unit (not illustrated) in the processing resource management unit 212 executes resource management for an application processing (e.g. a subroutine) distributed to application processing resources by the processing distribution function and executes process assignment to application processing resources.

Further, in the processing device 21, before performing determination in step S102, the resource usage amount measurement unit 2121 measures a load on (usage amount of) communication processing resources. Further, the resource usage amount measurement unit 2121 further measures, as resource usage amount measurement of each application processing, a usage amount of application processing resources and a usage amount of surplus resources of communication processing resources. The resource usage amount measurement unit 2121 notifies the billing unit 213 of information of the measured resource usage amounts.

In steps S107 and S108 of FIG. 4, the billing unit 213 calculates a billing amount of money, for example, based on the billing model illustrated in FIG. 6. More specifically, the billing model setting unit 2131 determines which model is applied, based on whether an application processing to be a billing target has used, as processing resources, application processing resources or surplus resources of communication processing resources.

Further, in steps S107 and S108, the unit price determination unit 2132 determines which usage unit price is applied to an application processing to be a target in accordance with the measurement result of the resource usage amount measurement unit 2121 and the billing model. When, for example, for a non-priority application processing, communication processing resources are used and a surplus rate of the communication processing resources is 30%, this number falls within "a surplus rate: 0% to 40%," and therefore this case corresponds to a usage unit price of communication processing resources having a value obtained by multiplying a basic unit price Xv by 0.5.

The usage fee calculation unit 2133 calculates a usage fee of the application processing from a usage unit price of application processing resources and a usage amount of the application processing resources for each predetermined time interval, and a usage unit price of surplus resources of communication processing resources and a usage amount of the surplus resources for each predetermined time interval.

As described above, in the present example embodiment, a billing model/usage unit price in which a usage fee varies has been applied to a non-priority application processing in accordance with a usage amount of application processing resources or a usage amount of surplus resources of communication processing resources. However, the billing model/usage unit price applied to a non-priority application processing is not limited thereto.

FIG. 7 is a diagram illustrating an example of another billing model. For each billing model, a configuration is made from variation conditions and calculation equations of usage unit prices for the respective conditions. FIG. 7 is a simple example for description, but practically, no problem is produced even when variation conditions and usage unit prices are indicated in more detail.

Example 1) Entire Processing Amount-Dependent Model

This is a model in which depending on a usage rate of processing resources of the entire processes including a communication processing and an application processing as another process, a resource usage unit price of the application processing varies. For example, when the entire processing resource usage rate is large, a normal unit price is applied, and when the rate is small (i.e. there are a large number of surplus resources), an inexpensive unit price is applied in a stepwise manner.

Example 2) Time Zone-Dependent Model

It is known that communication traffic is unevenly distributed according to an area and a time zone. For example, in a midnight time zone, communication traffic decreases in an office area, a commercial area, and a residential area, compared in daytime or evening time zones. Further, also with regard to a bill for electricity consumed by a server, for example, night power after 23:00 may be inexpensive, depending on a contract with an electric power company. Therefore, this is a model in which depending on a usage time zone that is external information, a resource usage unit price varies. For example, in a commuting time zone of the daytime, a normal unit price is applied, and in a midnight time zone, an inexpensive unit price is applied, compared in a daytime time zone. Further, a model in which a resource usage unit price varies in a combination between a day of the week or a public holiday such as a weekday, a holiday, or the like and a time zone is also included in this model.

Example 3) Usage Power Amount-Dependent Model

It is conceivable that a bill for electricity consumed by a server may be a stepwise unit price in accordance with a metered rate depending on a contract with an electric power company. This is a model in which in such a case, depending on a variation of an electricity unit price in accordance with a usage power amount that is external information, a usage unit price of processing resources also varies. When, for example, a usage power amount exceeds a threshold and thereby a power unit price increases, a usage unit price of processing resources also increases, and when a usage power amount is lower than the threshold and a power unit price is inexpensive, a usage unit price of processing resources also becomes inexpensive. In the time zone-dependent model of FIG. 7, "a time zone: 2:00-6:00" represents a time zone of at or after 2:00 and before 6:00, "a time zone: 6:00-18:00" represents a tine zone of at or after 6:00 and before 18:00, "a time zone: 18:00-23:00" represents a time zone of at or after 18:00 and before 23:00, and "a time zone: 23:00-2:00" represents a time zone of at or after 23:00 and before 2:00. Further, in the usage power amount-dependent model, "a power amount: 0 kWh-70 kWh" represents a case from 0 kWh to 70 kWh, "a power amount: 70 kWh-170 kWh" represents a case from larger than 70 kWh to 170 kWh, "a power amount: 170 kWh-270 kWh" represents a case from 170 kWh to 270 kWh, and "a power amount: 270 kWh-" represents a case of larger than 270 kWh.

Further, a billing model in which the billing models described in example 1 to example 3 and the like are combined can be also set. This is, for example, a billing model also depending on a communication processing resource amount for each time zone in which a power unit price varies depending on a contract with an electric power company.

[Description of Programming Method and Processing Distribution Function]

Figure 8A:
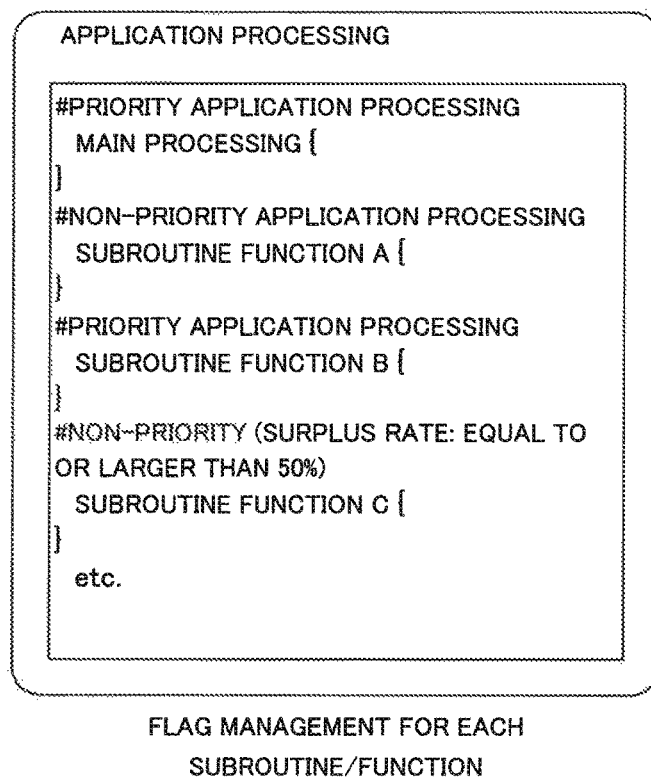
FIG. 8A is a diagram illustrating one example of an application processing program of the second example embodiment.
Figure 8B:
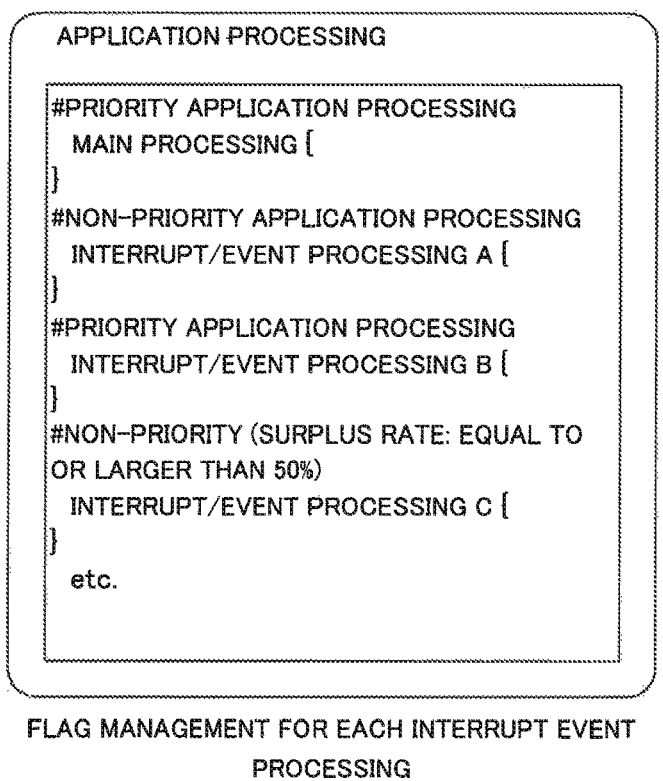
FIG. 8B is a diagram illustrating another example of the application processing program of the second example embodiment.

Next, a programming method for an application processing to realize the operation of the processing device 21 in the second example embodiment (to effectively use surplus resources) and cooperation with a processing distribution function in the processing resource allocation unit 2122 will be described. FIG. 8A is a diagram illustrating one example of a program for effectively using surplus resources for a non-priority application processing. FIG. 8B is a diagram illustrating another example of a program for effectively using surplus resources for a non-priority application processing.

(1) As an example of a program for intentionally using surplus resources, a method for setting a flag for each subroutine or function as in the application processing program illustrated in FIG. 8A will be described. Conceivable is a method in which in a program, a flag (e.g. "a priority application processing" or "a non-priority application processing") is set for each subroutine; during compiling, an execution file is created through compiling for each flag, for example, using a preprocessor; and in the processing resource management unit 212, management is performed as separate processing programs or virtual machines (VMs). At that time, the processing distribution function in the processing resource allocation unit 2122 distribution-controls whether execution is made by application processing resources based on a flag set for a processing program or execution is made by surplus resources of communication processing resources. Further, flag setting in accordance with a surplus rate of processing resources (e.g. "non-priority (a surplus rate of 50% or more)") can be also executed, and in this case, a communication processing resource management unit in the processing resource management unit 212 executes processing only in a situation where a resource condition for the flag is satisfied. When the condition is not satisfied, processing execution is caused to wait until a situation where the condition is satisfied.

(2) Further, as another method, as illustrated in FIG. 8B, there is a method for flag-managing by what processing resources execution is made for each event type such as an interrupt on a program. Using an external interrupt or internal software interrupt, flag setting for explicitly indicating processing resources to be used for each of the interrupts (events) is executed. A condition such as a surplus rate of processing resources may be provided as necessary. In this case, the processing distribution function in the processing resource allocation unit 2122 includes a function of executing, for example, processing distribution of a main routine of an application processing to an application processing resource side and executing, at a timing when an interrupt subroutine associated with event occurrence is executed, processing distribution of the subroutine to the application processing resource side or a surplus resource side of communication processing resources in accordance with a flag. In the case of server virtualization, at a timing when a subroutine event of a surplus resource side of communication processing resources occurs, a virtual machine (VM) is activated via processing on the surplus resource side.

(3) Further, as still another method, there is a method for setting/controlling a processing resource amount to be used from a billing model side without explicitly indicating an intentional flag and the like on a program. This is a method for executing setting, in a contract stage, that, for example, in the billing model setting unit 2131, a usage upper-limit amount of application processing resources is set and application processing resources are used up to a predetermined processing resource usage amount (threshold), but when this amount is exceeded, processing is executed on a surplus resource side of communication processing resources. In this case, the processing distribution function of the processing resource allocation unit 2122 refers to information of a predetermined processing resource usage amount (upper-limit threshold) set in the billing model setting unit 2131 and distribution-controls, at a timing when a subroutine is executed for each event such as an interrupt in an application processing, by which one of processing resources execution is made from the information of the application processing resource usage amount.

Advantageous Effects

As described above, application processing resources and communication processing resources are separately managed, and thereby surplus resources can be intentionally used. Therefore, it is possible to more effectively use processing resources surplus due to uneven distribution of traffic. Specifically, a flag is set for each subroutine or event or usage upper-limit setting for application processing resources in a billing model is executed, and thereby processing executed on an application processing resource side can be limited. Therefore, a communication carrier gains a large advantage that facilities for only application processing resources may be installed. Further, surplus resources of communication processing resources are rented at an inexpensive unit price, and therefore a communication carrier obtains an income (although low) by using surplus resources for a communication processing. Further, an application processing provider can use processing resources at an inexpensive price.

Third Example Embodiment

A third example embodiment will describe a processing device that executes an application processing programmed to operate in accordance with resource usage amount information.

In the third example embodiment, the processing device in the second example embodiment feeds back a processing resource usage situation and the like to an application processing program side and controls processing resources in accordance with the processing resource usage situation.

[Configuration]

Figure 9:
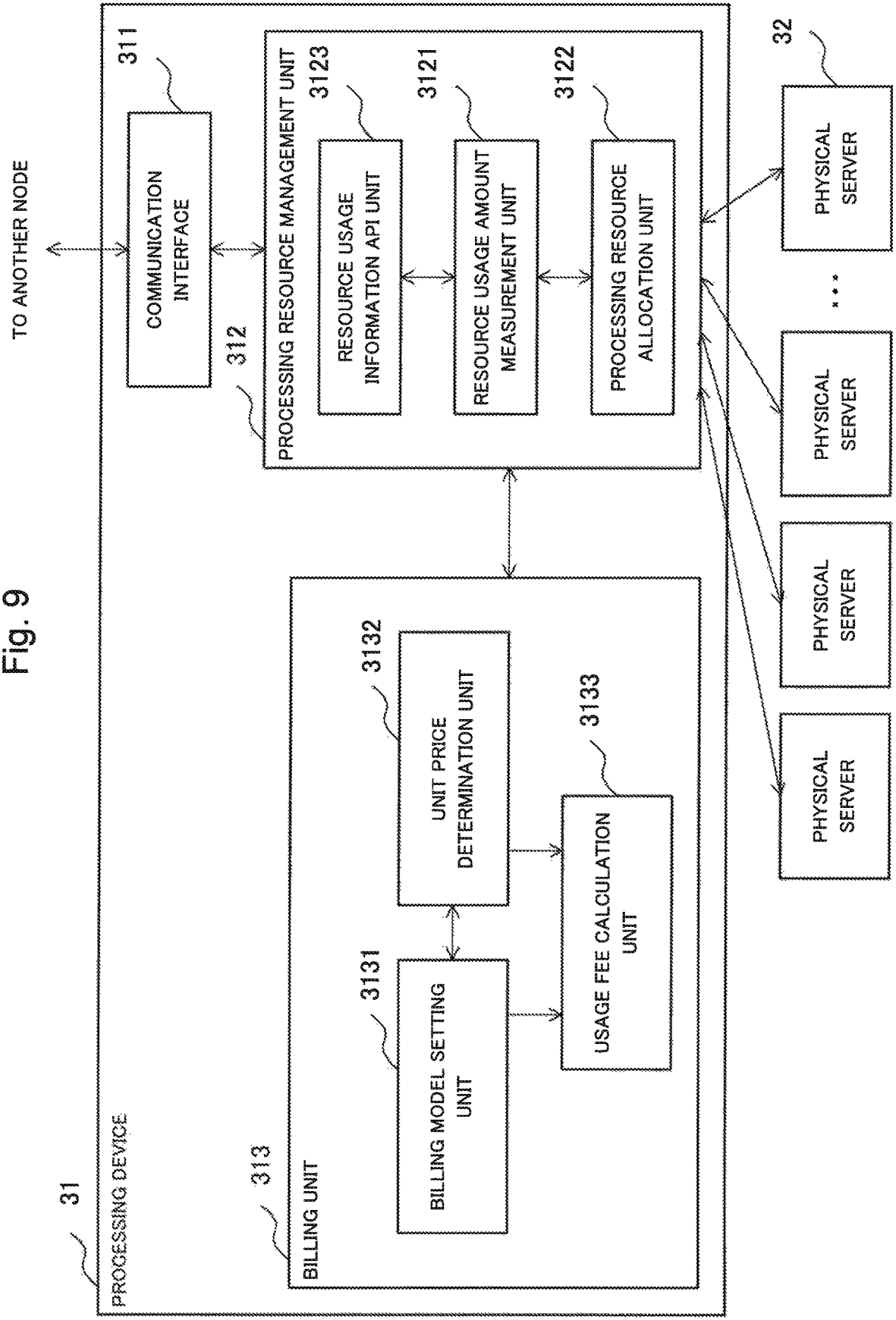
FIG. 9 is a block diagram illustrating a configuration example of a processing device in a third example embodiment.

FIG. 9 is a block diagram illustrating a configuration example of a processing device 31 in the third example embodiment. In the figure, the processing device 31 is different from the processing device 21 in the second example embodiment in a point that a resource usage information API (Application Programming Interface) unit 3123 is newly included in a processing resource management unit 312. Other components in the processing device 31 are the same as in the processing device 21 of the second example embodiment. The processing device 31 includes a communication interface 311, the processing resource management unit 312, and a billing unit 313. The processing resource management unit 312 includes a resource usage amount measurement unit 3121 and a processing resource allocation unit 3122. Further, the processing resource management unit 312 is connected to a plurality of physical servers 32. The billing unit 313 includes a billing model setting unit 3131, a unit price determination unit 3132, and a usage fee calculation unit 3133.

In the present example embodiment, the resource usage information API unit 3123 feeds back a usage situation of processing resources to a program (hereinafter, an application processing program) side for executing an application processing. More specifically, the resource usage information API unit 3123 includes a function of acquiring, when the API (resource usage information reference API) is executed in an application processing program, necessary information from the unit price determination unit 3132 or the resource usage amount measurement unit 3121 and returning the information to the application processing program as a return value. As a type of the resource usage amount reference API, an index that is a basis of a usage unit price condition for billing model setting is defined. There are, for example, a communication processing resource usage rate (or a communication processing resource usage amount), an entire processing resource usage rate (or an entire processing resource usage amount), usage power amount information, and predicted values at a next certain time thereof. Further, as an API of another type, an API function (resource usage information activation API) of activating, when a resource usage amount to be an index therefor becomes equal to or smaller than a value specified by variables, the application processing from the processing resource management unit 312 side is also included.

Further, the unit price determination unit 3132 further includes a function of feeding back resource usage information such as a usage rate of processing resources at a time as needed to the resource usage information API unit 3123. The unit price determination unit 3132 may include a function of accumulating and analyzing/learning resource usage amount information and thereby predicting (being capable of referring to a prediction value) each piece of information at a next certain time.

Further, as described above, the resource usage amount measurement unit 3121 may directly notify the resource usage information API unit 3123 of a processing resource usage amount for each application processing and the like, depending on API information necessary for a program.

Other function blocks are the same as in the second example embodiment, and therefore description will be omitted.

[Operation]

Next, using a flowchart of FIG. 10, an operation of the processing device 31 of the present example embodiment will be described.

The processing device 31 outputs a load on (a usage amount/rate of) processing resources to an application processing program side (step S301). More specifically, the device outputs a load on (a usage amount/rate of) processing resources acquired from the resource usage amount measurement unit 3121 or the unit price determination unit 3132 to an application processing program side. By the output to the application processing program side, an operation considering a load on processing resources acquired upon executing the program is made possible.

Next, the processing device 31 determines whether there is a non-priority application processing that needs allocation of processing resources (step S302). Step S302 is the same as the operation of step S101 of FIG. 3.

The processing device 31 determines, when determining that there is a non-priority application processing that needs allocation in step S302 (step S302, YES), whether a load on communication processing resources is equal to or smaller than a predetermined threshold (step S303). On other hand, when it is determined that there is no non-priority application processing that needs allocation in step S302 (step S302, NO), the processing is terminated.

The processing device 31 allocates, when determining that the load on communication processing resources is equal to or smaller than the predetermined threshold in step S303 (step S303, YES), communication processing resources to the non-priority application processing (step S304). On other hand, when it is determined that the load on communication processing resources is not equal to or smaller than the predetermined threshold in step S303 (step S303, NO), the processing is terminated. "The termination" herein may mean "a wait" of processing execution. Steps S302, S303, and S304 are the same as the operations of steps S101, S102, and S103 in FIG. 3, respectively.

Figure 10:
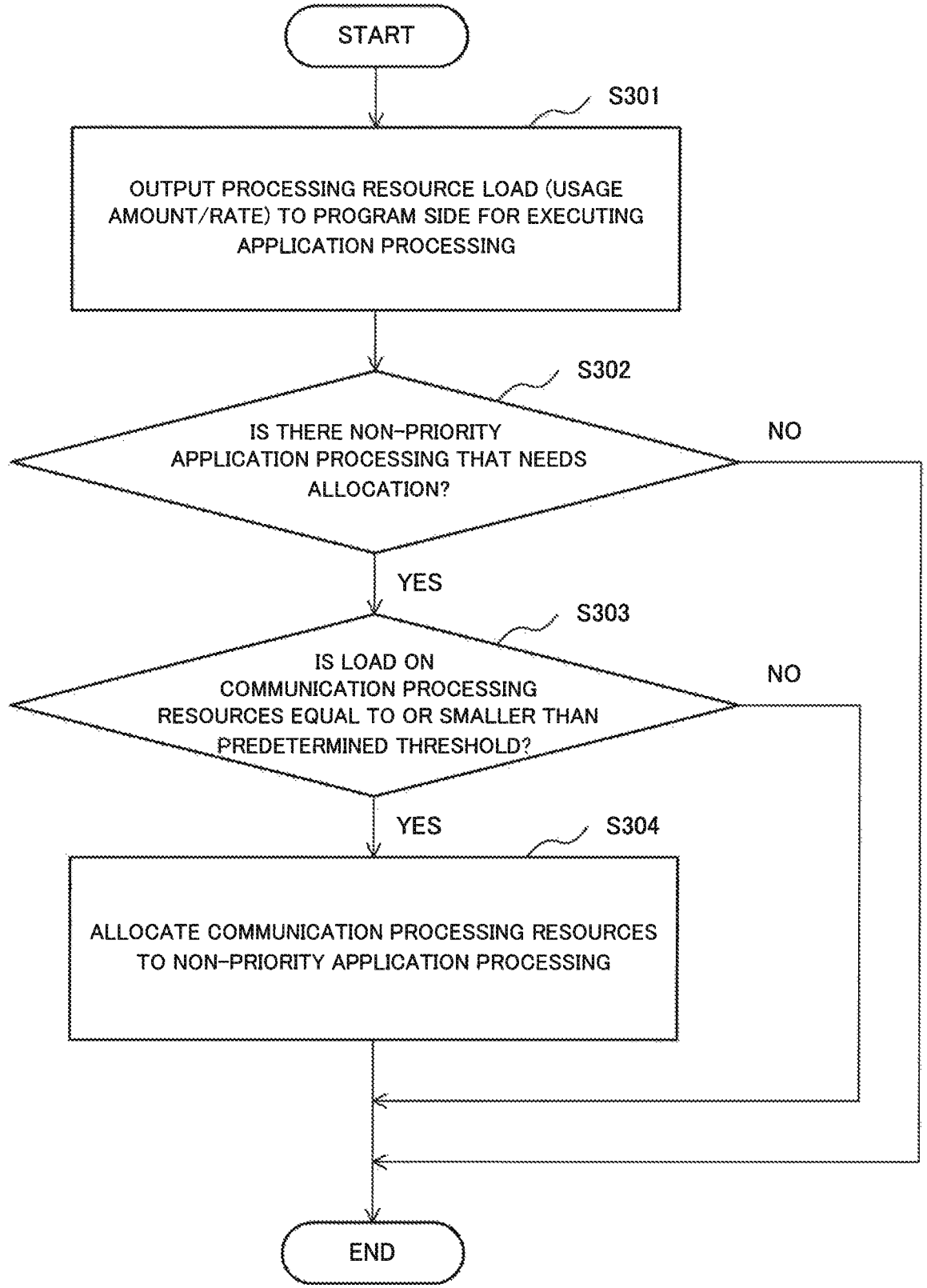
FIG. 10 is a flowchart illustrating an operation example of the processing device in the third example embodiment.

In FIG. 10, step S301 is operated before step S302, but the operation of step S301 may exist after step S302, YES.

Further, step S104 of FIG. 3 is not necessary processing as described above, and therefore is not described for description simplification in the present example embodiment. However, also in the present example embodiment, processing of step S104 of FIG. 3 may be executed after step S303, NO.

An operation of a billing processing is the same as in FIG. 4 and therefore description is omitted herein.

[Description of Programming Method]

Figure 11:
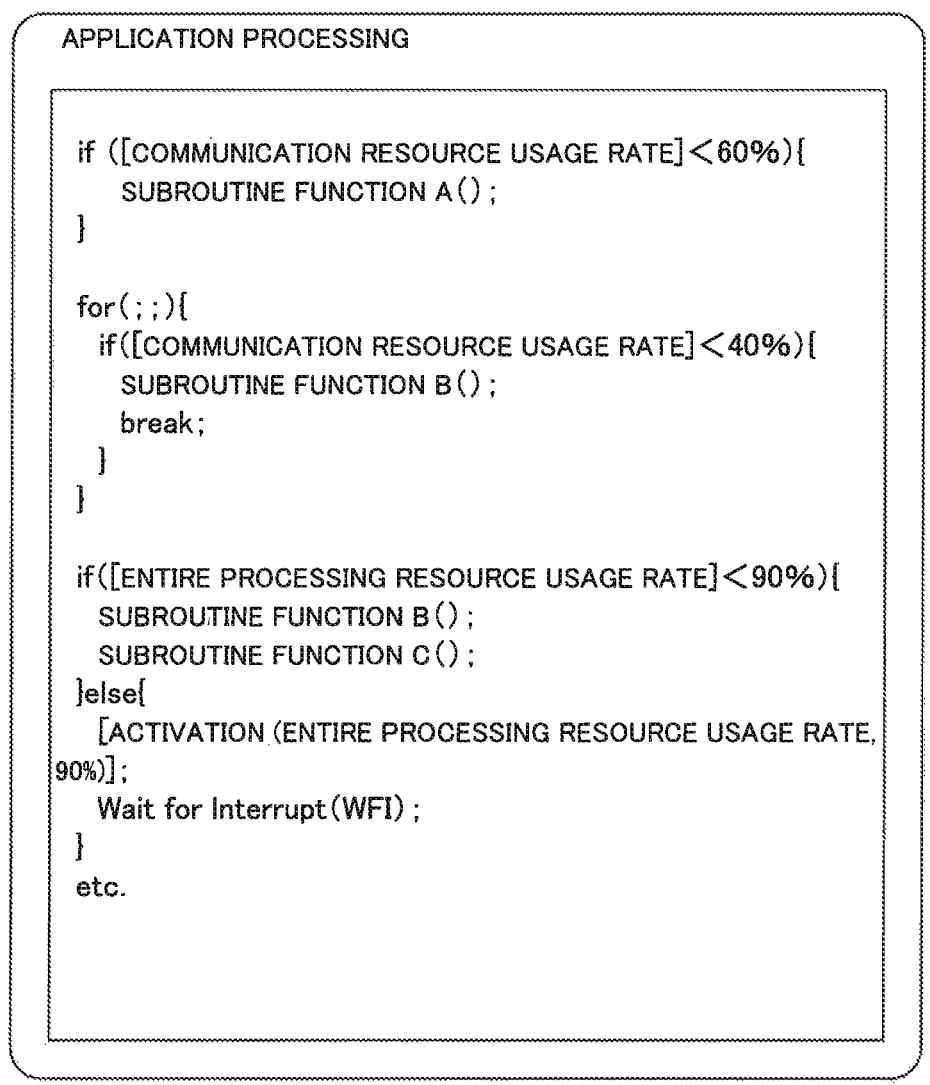
FIG. 11 is a diagram illustrating an example of an application processing program of the third example embodiment.

Next, a programming method for an application processing to realize the operation of the processing device 31 in the third example embodiment (to effectively use surplus resources) will be described by referring to FIG. 10 as appropriate. FIG. 11 is a diagram illustrating an example of a program for effectively using surplus resources by using a resource usage information API with respect to an application processing.

As an example of a program using a resource usage information reference API, as illustrated on an upper side of FIG. 11, an API capable of referring to a desired resource usage amount is described in an application processing program and a return value thereof is used for execution condition determination of a subroutine thereafter, and thereby execution of processing or a wait for execution is made possible.

In other words, the processing device 31 that executes the present program determines that step S302 of FIG. 10 is "YES" from a program sentence "if ([communication resource usage rate]<60% . . . " of FIG. 11.

Further, the processing device 31 determines a case in which a condition of the program sentence "if ([communication resource usage rate]<60% . . . " is satisfied as "YES" in step S303 of FIG. 10.

As in step S303, NO of FIG. 10, when execution is caused to wait, there are a case in which, in an example of C language, execution is caused to wait by simple polling processing such as a for sentence or a while sentence and a method in which, as illustrated on a lower side of FIG. 11, using a resource usage information activation API that is an API of another type, an API set with a condition to be a trigger of activation is executed and a WFI (Wait for Interrupt) state is established and the like. In the case of the latter method, when an activation condition is satisfied, the application processing is activated from the processing resource management unit 312 side. A communication resource usage rate in FIG. 11 indicates a usage rate of communication processing resources, and an entire processing resource usage rate indicates a usage rate of the entire processing resources.

Advantageous Effects

As described above, information of a resource usage amount can be referred to as an API from a program, and thereby processing resources in a surplus state can be intentionally used. Further, when a resource usage rate is high, a processing device can be also caused to wait for processing. In other words, an application provider can intentionally use, when using a resource usage information API, processing resources in an inexpensive billing model. Therefore, effective use of surplus resources associated with uneven distribution of traffic is further promoted.

Fourth Example Embodiment

In a fourth example embodiment, a case in which the processing device 21 in the second example embodiment is a radio base station connected to a terminal via a wireless line will be described. A communication processing executed in the radio base station in the present example embodiment conforms to, for example, a communication processing executed in a radio base station of LTE in 3GPP (3rd Generation Partnership Project). Further, the radio base station in the present example embodiment also includes a function of executing an application processing in addition to a communication processing.

[Configuration]

Figure 12:
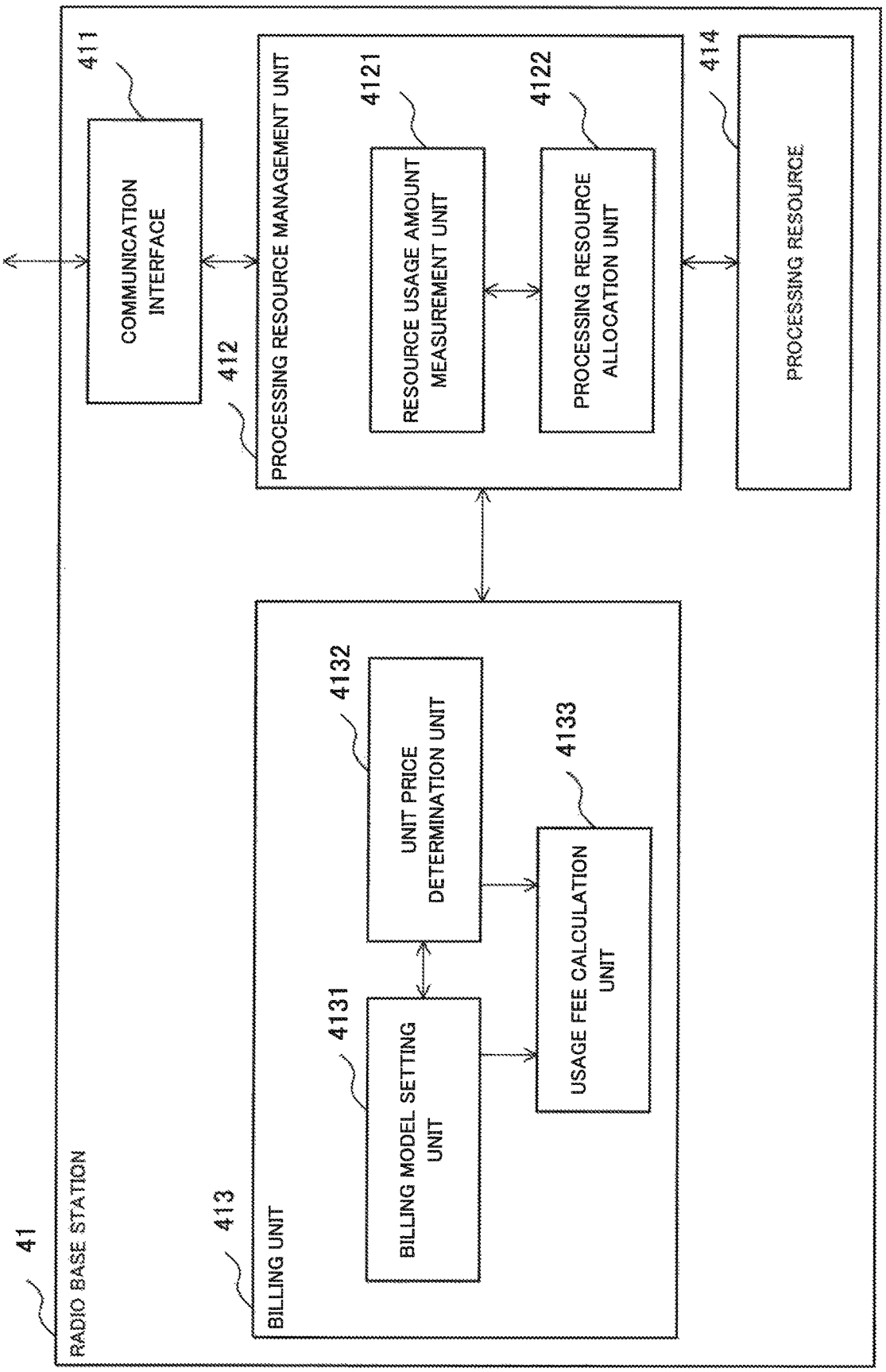
FIG. 12 is a block diagram illustrating a configuration example of a radio base station in a fourth example embodiment.

FIG. 12 is a diagram illustrating a configuration example of a radio base station 41 in the fourth example embodiment. The radio base station 41 includes a communication interface 411, a processing resource management unit 412, and a billing unit 413. The processing resource management unit 412 includes a resource usage amount measurement unit 4121 and a processing resource allocation unit 4122. Further, the processing resource management unit 412 is connected to a processing resource 414. The billing unit 413 includes a billing model setting unit 4131, a unit price determination unit 4132, and a usage fee calculation unit 4133. The radio base station 41 in the present example embodiment transmits data received from a core network node to a radio terminal (downlink communication). Further, the base station 41 transmits data received from a radio terminal to a core network node (uplink communication). Transmission/reception of data by the radio base station 41 is executed via the communication interface 411. In other words, the communication interface 411 in the present example embodiment includes a radio communication interface for communication with a radio terminal and an interface for communication with a core network node.

Further, it is assumed that a processing resource in the radio base station 41 of the present example embodiment is included in the radio base station 41 as the processing resource 414. The processing resource 414 may be a memory and a processor included in a radio base station in the same manner as in other example embodiments, or at least one virtual machine virtually constructed by executing, by using the processor, a program stored in the memory may be used as a processing resource. Further, a physical server connected to the radio base station 41 may be used as a processing resource in the present example embodiment. Other components are the same as the components of the processing device 21 in the second example embodiment illustrated in FIG. 5, and therefore detailed description will be omitted.

Transmission/reception of data of the radio base station 41 is executed using various types of protocols in respective layers. A protocol stack (3GPP TS.23.401 V12.5.0) of U-Plane (User Plane) in a radio base station and a core network node in LTE is illustrated in FIG. 13.

Figure 13:
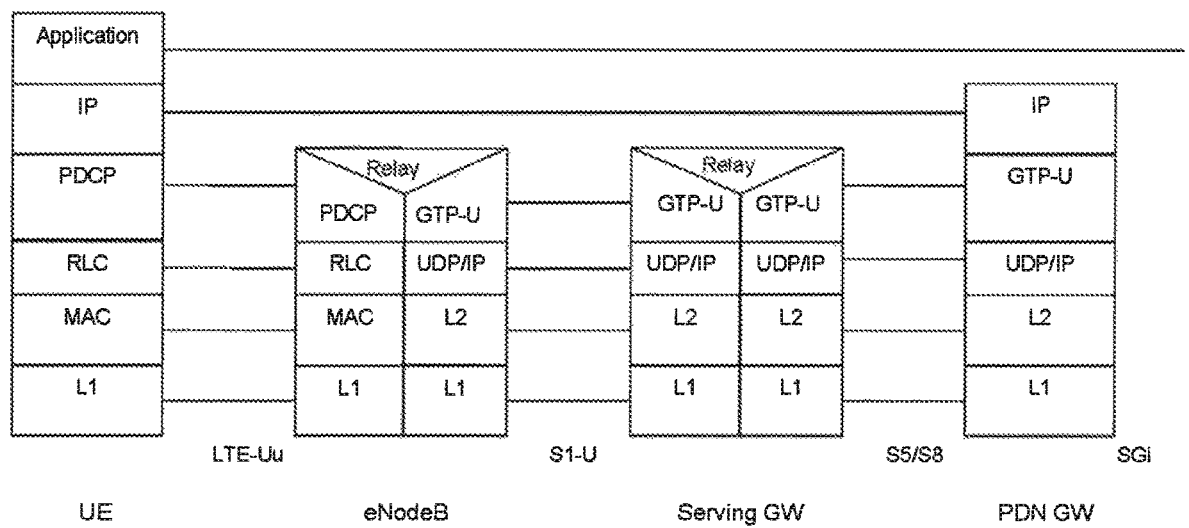
FIG. 13 is a diagram illustrating a protocol stack of U-Plane of LTE of 3GPP.

In FIG. 13, a UE (User Equipment, a radio terminal) executes communication (transmission/reception of data) with a radio base station (eNB (eNodeB)) by using communication protocols of an L1 (PHY (PHYsical)) layer, a MAC (sub)layer, an RLC (sub)layer, and a PDCP (Packet Data Convergence Protocol) (sub)layer. The radio base station executes communication (transmission/reception of data) with the radio terminal by using the communication protocols of the L1 layer, the MAC (sub)layer, the RLC (sub)layer, and the PDCP (sub)layer. Further, the radio base station executes communication (transmission/reception of data) with a Serving GW (Gate Way) by using communication protocols of a GTP-U (GPRS (General Packet Radio Service) Tunneling Protocol for User Plane) layer, a UDP (User Datagram Protocol)/IP (Internet Protocol) layer, an L2 layer, and an L1 layer. Communication (transmission/reception of data) is executed using the same communication protocols also between a Serving GW and a PDN (Packet Data Network)-GW.

Figure 14:
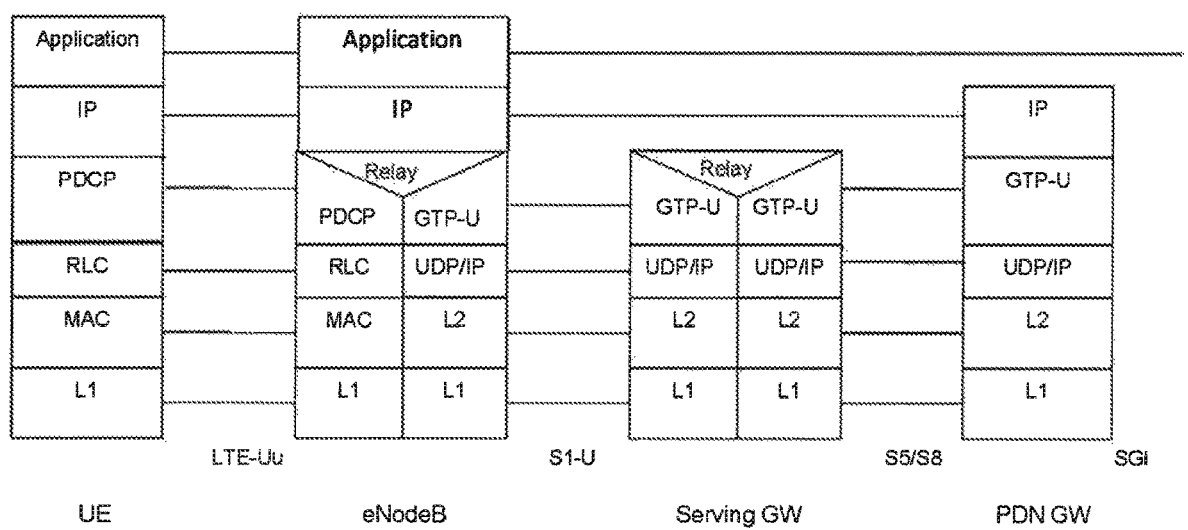
FIG. 14 is a diagram illustrating a protocol stack of the radio base station and the like of the fourth example embodiment.

A protocol stack in which a function of the radio base station 41 of the present example embodiment is added to the protocol stack in LTE of 3GPP illustrated in FIG. 13 is illustrated in FIG. 14. In FIG. 14, the radio base station 41 further includes a function of executing communication using protocols of an IP layer and an Application layer higher than the PDCP layer and the GTP-U layer. Further, although not illustrated in FIG. 14, a function of executing communication using a communication protocol of a UDP/TCP layer higher than the PDCP layer and the GTP-U layer may be included.

Herein, the above-described communication processing in each of the example embodiments includes, in the present example embodiment, a process executed using a communication protocol of at least one layer of the PDCP layer, the RLC layer, the MAC layer, the PHY layer, the GTP-U layer, or the UDP/IP layer lower than the GTP-U.

Further, of the above-described application processings in the example embodiments, a priority application processing executable in a preferential manner includes a process accompanied with a communication processing with the outside of an own processing device in a lower layer such as a PDCP layer among processes executed using communication protocols of an Application layer and at least one of an UDP/TCP layer or an IP layer higher than the PDCP or the GTP-U.

When, for example, application data has been transmitted (distributed) from an application server (not illustrated) higher than the radio base station 41 to a radio terminal, a communication processing is executed using a communication protocol of a lower layer such as a PDCP layer in association with an application processing for transferring the application data to the radio terminal in the radio base station 41. Therefore, the application data to be distributed to the radio terminal can be allocated to processing resources or the like as a priority application processing in the radio base station 41.

In the radio base station 41 in the present example embodiment, information may be shared between a layer equal to or lower than a PDCP/GTP-U layer and a layer higher than the PDCP/GTP-U layer. The sharing may be executed using a predetermined API such as a resource usage information API in the third example embodiment. Further, it is possible that the radio base station 41 includes, for example, functions of DPI (Deep Packet Inspection) and TCP split and thereby information is shared between layers by using the functions.

The present example embodiment is also applicable with another configuration. The radio base station 41 may be, for example, a control device (core network node) included in a higher level of a radio base station. Further, a function of the billing unit and a function of the processing resource management unit of the processing device 21 in the second example embodiment may be disposed in a core network node and a radio base station, respectively, by being distributed from each other. At that time, a core network node including the function of the billing unit may be a PCRF (Policy and Charging Rules Function) node in 3GPP.

Further, the radio base station 41 in the present example embodiment may be a centralized control unit (Centralized Base Station or Base Station Center) in C-RAN. In this case, the communication interface 411 may be a communication interface with an RRH (Remote Radio Head).

Further, a communication processing executed in the radio base station 41 in the present example embodiment has been described as conforming to, for example, a communication processing executed in a radio base station of LTE in 3GPP but is not limited thereto. The communication processing may be, for example, a communication processing executed in a radio base station in a third-generation communication system such as W-CDMA (Wideband Code Division Multiple Access), LTE-Advanced, and a next generation communication system such as 5G.

[Operation]

An operation of the radio base station 41 in the present example embodiment is equivalent to the operation of the processing device of each of the above-described example embodiments, and therefore description will be omitted.

Advantageous Effects

As described above, the radio base station 41 in the present example embodiment further includes a function of executing an application processing and can assign an application processing that is not accompanied with a communication processing with the outside of the own radio base station to communication processing resources as a non-priority application processing under a predetermined condition, and thereby processing resources in a radio base station that executes edge computing (MEC: Mobile Edge Computing) can be effectively used. Further, a usage fee of communication processing resources allocated to a non-priority application processing is billed to a user of an application processing at a low price, and thereby effective use of processing resources can be further promoted.

Other Example Embodiments

While several example embodiments have been described, there is no limitation to these example embodiments.

For example, the billing unit 313 in the processing device 31 in the third example embodiment may set a billing model as in FIG. 15. The billing model of FIG. 15 does not explicitly indicate whether to be a usage fee of communication processing resources or a usage fee of application processing resources to a user of an application processing and simply sets/presents only a usage fee of processing resources. Herein, it is assumed that, for example, in a case of a communication processing amount-dependent model, a processing device operates in such a way as to execute an application processing by using application processing resources when a surplus rate of communication processing resources is 0% to 40% and to execute a non-priority application processing by using communication processing resources when a surplus rate of communication processing resources is equal to or larger than 41%. Each usage unit price in the billing model of FIG. 15 is set in such a way that a unit price of a resource surplus rate of equal to or larger than 41% is more inexpensive than a unit price of a resource surplus rate of 0% to 40%. In this case, a user of an application processing may hope to use processing resources at a lower unit price, regardless of by which one of application processing resources and communication processing resources the process is executed and regardless of a condition for a resource surplus rate. Therefore, the user of the application processing may create a program that "when a resource surplus rate is equal to or larger than 41%, a non-priority application processing is executed" by using the resource usage information API unit 3123 and thereby cause the process to be executed. In this manner, a lower usage unit price of processing resources may be used to contribute to effective use of surplus resources of communication processing resources. In the time zone-dependent model of FIG. 15, "a time zone: 2:00-6:00" represents a time zone of at or after 2:00 and before 6:00, "a time zone: 6:00-18:00" represents a time zone of at or after 6:00 and before 18:00, "a time zone: 18:00-23:00" represents a time zone of at or after 18:00 and before 23:00, and "a time zone: 23:00-2:00" represents a time zone of at or after 23:00 and before 2:00. Further, in the usage power amount-dependent model, "a power amount: 0 kWh-70 kWh" represents a case from 0 kWh to 70 kWh, "a power amount: 70 kWh-170 kWh" represents a case from larger than 70 kWh to 170 kWh, "a power amount: 170 kWh-270 kWh" represents a case from 170 kWh to 270 kWh, and "a power amount: 270 kWh-" represents a case of larger than 270 kWh. The billing model illustrated in FIG. 15 that does not explicitly indicate whether to be a usage fee of communication processing resources or a usage fee of application processing resources to a user of an application processing is also applicable to other example embodiments. In other words, the billing model of FIG. 15 is also applicable to the communication processing amount-dependent model of FIG. 6, the entire processing amount-dependent model, the time zone-dependent model, and the usage power amount-dependent model of FIG. 7, and the like.

Further, the above-described processing device and radio base station can be realized using hardware, software, or a combination of these. Further, control methods for the above-described processing device and radio base station can be also realized using hardware, software, or a combination of these. Herein, the realization using software means realization made by reading and executing a program by a computer.

A program is stored using various types of non-transitory computer readable media and can be supplied to a computer. The non-transitory computer readable media includes various types of tangible storage media. Examples of the non-transitory computer readable medium include a magnetic recording medium (e.g. a flexible disk, a magnetic tape, and a hard disk drive), a magneto-optical recording medium (e.g. a magneto-optical disk), a CD-ROM (Compact Disc-Read Only Memory), a CD-R, a CD-R/W, a DVD-ROM (Digital Versatile Disc-ROM), a DVD-R, a DVD-R/W, and a semiconductor memory (e.g. a mask ROM, a PROM (Programmable ROM), an EPROM (Erasable PROM), a flash ROM, and a RAM (Random Access Memory)). Further, the program may be supplied to a computer by using various types of transitory computer readable media. Examples of the transitory computer readable medium include electric signals, optical signals, and electromagnetic waves. The transitory computer readable medium can supply a program to a computer via a wired communication channel such as an electric wire, and an optical fiber, or a wireless communication channel.

Further, a direction of an arrow in the figures illustrates one example and does not limit a direction of a signal between blocks.

While several example embodiments have been described above, it should be noted that the disclosed subject matter is not limited to these example embodiments, and various modifications and combinations are possible within the scope not departing from the gist of the disclosed subject matter having been already described.

Further, a part or the whole of the example embodiments can be described as, but not limited to, the following supplementary notes.

Supplementary Note 1

A processing device that allocates processing resources to at least a communication processing and an application processing and executes at least the communication processing and the application processing, the processing device includes:

a communication interface that transmits/receives data associated with the communication processing; and at least one processor that operates to execute at least a scheduling processing that allocates communication processing resources that are at least a part of the processing resources to the communication processing in a preferential manner and a billing processing that bills a user of the application processing according to a usage amount of processing resources used for the application processing, the application processing including a non-priority application processing processable in a non-preferential manner, the scheduling processing in the processor being capable of allocating, when a load on the communication processing resources allocated to the communication processing does not reach a predetermined threshold, the communication processing resources to the non-priority application processing, and the billing processing in the processor billing for the non-priority application processing at a usage fee of the communication processing resources more inexpensive than a usage fee of resources of a part different from the communication processing resources of the processing resources.

Supplementary Note 2

The processing device according to claim 1, wherein the resources of a part different from the communication processing resources of the processing resources are application processing resources allocated to the application processing in a preferential manner.

Supplementary Note 3

The processing device according to claim 1 or 2, wherein the non-priority application processing is an application processing that is not accompanied with a communication processing with an outside of the own processing device.

Supplementary Note 4

The processing device according to any one of supplementary notes 1 to 3, wherein the processing resources include at least a part of the processor or a part of the storage device included in the processing device and the load on the communication processing resources is at least one of a usage rate, a usage time, or a usage amount of the communication processing resources or at least one statistical value of the usage rate, the usage time, or the usage amount.

Supplementary Note 5

The processing device according to any one of supplementary notes 1 to 3, the processing device being connected to a plurality of physical servers as the processing resources, wherein the communication processing resources are at least one or a part of a processor or a storage device included in at least one physical server of the plurality of physical servers and the load on the communication processing resources is at least one of a usage rate, a usage time, or a usage amount of the communication processing resources, a usage rate, a usage time, or a usage amount of the processing resources, or at least one statistical value of the usage rate, the usage time, or the usage amount.

Supplementary Note 6

The processing device according to any one of supplementary notes 1 to 3, the processing device further includes at least one memory, wherein the processing resources are at least one virtual machine virtually constructed by executing, using the processor on the processing device, a program stored on the memory, the communication processing resources are at least a part of the virtual machine, and the load on the communication processing resources is at least one of a usage rate, a usage time, or a usage amount of the communication processing resources, a usage rate, a usage time, or a usage amount of the processing resources, or at least one statistical value of the usage rate, the usage time, or the usage amount.

Supplementary Note 7

The processing device according to any one of supplementary notes 1 to 6, the processing device being disposed in a radio base station or a node connected to a higher level of the radio base station, wherein the communication processing is a process executed in at least one communication protocol layer of a PDCP (Packet Data Convergence Protocol) layer, an RLC (Radio Link Control) layer, a MAC (Medium Access Control) layer, a PHY (PHYsical) layer, a GTP-U (GPRS (General packet radio service) Tunneling Protocol for User Plane) layer, or a UDP (User Datagram Protocol)/IP (Internet Protocol) layer lower than the GTP-U.

Supplementary Note 8

The processing device according to any one of supplementary notes 1 to 6, wherein the communication processing includes at least one of baseband signal processing, Radio Link Control, radio resource scheduling, MAC (Medium Access Control) processing, Radio Resource Control, Radio Resource Management, packet processing, packet core processing, routing processing, switch processing, authentication, C-Plane processing, U-Plane processing, call processing, or mobility management, and the application processing includes at least one of image processing, voice processing, video processing, image authentication, biometric authentication, video distribution, arithmetic processing for robot control, arithmetic processing for system control, arithmetic processing for self-driving control, fault detection processing, natural language processing, machine learning processing, data analysis processing, data update processing, or maintenance processing.

Supplementary Note 9

The processing device according to claim 8, wherein the non-priority application processing includes at least one of the natural language processing, the machine learning processing, the data analysis processing, the data update processing, or the maintenance processing.

Supplementary Note 10

A control method for a processing device that allocates processing resources to at least a communication processing and an application processing and executes at least the communication processing and the application processing, the control method includes:

allocating communication processing resources that are at least a part of the processing resources to the communication processing in a preferential manner; and billing a user of the application processing according to a usage amount of processing resources used for the application processing, the application processing including a non-priority application processing processable in a non-preferential manner, wherein when a load on the communication processing resources allocated to the communication processing does not reach a predetermined threshold, the communication processing resources are capable of being allocated to the non-priority application processing, and a usage fee of the communication processing resources more inexpensive than a usage fee of resources of a part different from the communication processing resources of the processing resources is billed for the non-priority application processing.

Supplementary Note 11

A recording medium storing a program that causes a computer to execute a control method for a processing device that allocates processing resources to at least a communication processing and an application processing and executes at least the communication processing and the application processing, the program includes:

allocating communication processing resources that are at least a part of the processing resources to the communication processing in a preferential manner; and billing a user of the application processing according to a usage amount of processing resources used for the application processing, the application processing including a non-priority application processing processable in a non-preferential manner, wherein when a load on the communication processing resources allocated to the communication processing does not reach a predetermined threshold, the communication processing resources are capable of being allocated to the non-priority application processing, and a usage fee of the communication processing resources more inexpensive than a usage fee of resources of a part different from the communication processing resources of the processing resources is billed for the non-priority application processing.

This application is based upon and claims the benefit of priority from Japanese Patent Application No. 2015-037158, filed on Feb. 26, 2015, the disclosure of which is incorporated herein in its entirety.

REFERENCE SIGNS LIST 1, 21, 31 Processing device
111, 211, 311, 411 Communication interface
112 Processor
212, 312, 412 Processing resource management unit
2121, 3121, 4121 Resource usage amount measurement unit
2122, 3122, 4122 Processing resource allocation unit
3123 Resource usage information API unit
213, 313, 413 Billing unit
2131, 3131, 4131 Billing model setting unit
2132, 3132, 4132 Unit price determination unit
2133, 3133, 4133 Usage fee calculation unit
22, 32 Physical server
41 Radio base station
414 Processing resource

What is claimed is:

1. A processing device that allocates processing resources to at least a communication processing and an application processing and executes at least the communication processing and the application processing, the processing device comprising:

a communication interface that transmits/receives data associated with the communication processing; and at least one processor comprising:

a processing resource management unit configured to implement allocating processing comprising allocating a first portion of the processing resources to the communication processing, allocating a second portion of the processing resources to the application processing, and dividing the application processing into a priority application processing and a non-priority application processing; and a billing unit configured to bill a user of the application processing according to a usage amount of the processing resources used for the application processing, wherein the allocating processing, when the processing resource management unit determines that the load of the communication processing does not reach a predetermined threshold, includes improving an availability of processing the non-priority application processing by reallocating the first portion of the processing resource from the communication processing and to the non-priority application processing, wherein the billing processing includes billing the user of the non-priority application processing using the first portion of the processing resources at a usage fee of the first portion of the processing resources, wherein the usage fee of the first portion of the processing resources is less expensive than a usage fee of resources of a part different from the first portion of the processing resources, wherein the communication processing includes at least one of baseband signal processing, Radio Link Control, radio resource scheduling, MAC (Medium Access Control) processing, Radio Resource Control, Radio Resource Management, packet processing, packet core processing, routing processing, switch processing, authentication, C-Plane processing, U-Plane processing, call processing, and mobility management, and wherein the application processing includes at least one of image processing, voice processing, video processing, image authentication, biometric authentication, video distribution, arithmetic processing for robot control, arithmetic processing for system control, arithmetic processing for self-driving control, fault detection processing, natural language processing, machine learning processing, data analysis processing, data update processing, and maintenance processing.

2. The processing device according to claim 1, wherein the resources of the part different from the first portion of the processing resources are application processing resources allocated to the application processing.

3. The processing device according to claim 1, wherein the non-priority application processing is not accompanied with the communication processing with an outside of an own processing device.

4. The processing device according to claim 1, wherein
the processing resources include at least a part of the at least one processor or a part of a storage device included in the processing device, and
the load on the processing resources is at least one of a usage rate of the processing resources, a usage time of the processing resources, a usage amount of the processing resources, a statistical value of the usage rate, a statistical value of the usage time, and a statistical value of the usage amount.

5. The processing device according to claim 1, the processing device being connected to a plurality of physical servers as the processing resources, wherein
communication processing resources are at least one or a part of a processor, other than the at least one processor, and a storage device included in at least one physical server of the plurality of physical servers, and
the load on the processing resources is at least one of a usage rate of the communication processing resources, a usage time of the communication processing resources, a usage amount of the communication processing resources, a statistical value of the usage rate, a statistical value of the usage time, and a statistical value of the usage amount.

6. The processing device according to claim 1, the processing device further comprising at least one memory, wherein
the processing resources are at least one virtual machine virtually constructed by executing, using the at least one processor on the processing device, a program stored on the memory,
wherein the at least one virtual machine comprises communication processing resources, and
the load on the processing resources is at least one of a usage rate of the communication processing resources, a usage time of the communication processing resources, a usage amount of the communication processing resources, a usage rate of the processing resources, a usage time of the processing resources, or a usage amount of the processing resources, a statistical value of the usage rate of the communication processing resources, a statistical value of the usage time of the communication processing resources, a statistical value of the usage amount of the communication processing resources, a statistical value of the usage rate of the processing resources, a statistical value of the usage time of the processing resources, and a statistical value of the usage amount of the processing resources.

7. The processing device according to claim 1, the processing device being disposed in a radio base station or a node connected to a higher level of the radio base station, wherein
the communication processing is a process executed in at least one communication protocol layer of a PDCP (Packet Data Convergence Protocol) layer, an RLC (Radio Link Control) layer, a MAC (Medium Access Control) layer, a PHY (PHYsical) layer, a GTP-U (GPRS (General packet radio service) Tunneling Protocol for User Plane) layer, and a UDP (User Datagram Protocol)/IP (Internet Protocol) layer lower than the GTP-U.

8. The processing device according to claim 7, wherein the non-priority application processing includes at least one of the natural language processing, the machine learning processing, the data analysis processing, the data update processing, and the maintenance processing.

9. A control method for a processing device that allocates processing resources to at least a communication processing and an application processing and executes at least the communication processing and the application processing, the control method comprising:
implementing allocation processing comprising allocating a first portion of the processing resources to the communication processor, allocating a second portion of the processing resources to the application processing, and dividing the application processing into a priority application processing and a non-priority application processing; and
implementing billing processing comprising billing a user of the application processing according to a usage amount of the processing resources used for the application processing,
wherein the allocating processing, when it is determined that a load of the communication processing does not reach a predetermined threshold, includes improving an availability of processing the non-priority application processing by reallocating the first portion of the processing resources from the communication processing and to the non-priority application processing,
wherein the billing processing includes billing the user of the non-priority application processing using the first portion of the processing resources at a usage fee of the first portion of the processing resources,
wherein the usage fee is less expensive than a usage fee of resources of a part different from the first portion of the processing resources,
wherein the communication processing includes at least one of baseband signal processing, Radio Link Control, radio resource scheduling, MAC (Medium Access Control) processing, Radio Resource Control, Radio Resource Management, packet processing, packet core processing, routing processing, switch processing, authentication, C-Plane processing, U-Plane processing, call processing, and mobility management, and
wherein the application processing includes at least one of image processing, voice processing, video processing, image authentication, biometric authentication, video distribution, arithmetic processing for robot control, arithmetic processing for system control, arithmetic processing for self-driving control, fault detection processing, natural language processing, machine learning processing, data analysis processing, data update processing, and maintenance processing.

10. A non-transitory computer-readable recording medium storing a program that causes a computer to execute a control method for a processing device that allocates processing resources to at least a communication processing and an application processing and executes at least the communication processing and the application processing, the program comprising:
implementing allocation processing comprising allocating a first portion of the processing resources to the communication processor, allocating a second portion of the processing resources to the application processing, and dividing the application processing into a priority application processing and a non-priority application processing; and
implementing billing processing comprising billing a user of the application processing according to a usage amount of the processing resources used for the application processing,
wherein the allocating processing, when it is determined that a load of the communication processing does not reach a predetermined threshold, includes improving an availability of processing the non-priority application processing by reallocating the first portion of the processing resources from the communication processing to the non-priority application processing,
wherein the billing processing includes billing the user of the non-priority application processing using the first portion of the processing resources at a usage fee of the first portion of the processing resources, wherein the usage fee is less expensive than a usage fee of resources of a part different from the first portion of the processing resources, wherein the communication processing includes at least one of baseband signal processing, Radio Link Control, radio resource scheduling, MAC (Medium Access Control) processing, Radio Resource Control, Radio Resource Management, packet processing, packet core processing, routing processing, switch processing, authentication, C-Plane processing, U-Plane processing, call processing, and mobility management, and wherein the application processing includes at least one of image processing, voice processing, video processing, image authentication, biometric authentication, video distribution, arithmetic processing for robot control, arithmetic processing for system control, arithmetic processing for self-driving control, fault detection processing, natural language processing, machine learning processing, data analysis processing, data update processing, and maintenance processing.

* * * * *